US011148042B2

(12) United States Patent
Tobin

(10) Patent No.: US 11,148,042 B2
(45) Date of Patent: Oct. 19, 2021

(54) GEO LOCATION QUESTING

(71) Applicant: eBay Inc., San Jose, CA (US)

(72) Inventor: John Patrick Edgar Tobin, San Jose, CA (US)

(73) Assignee: eBay Inc., San Jose, CA (US)

(*) Notice: Subject to any disclaimer, the term of this patent is extended or adjusted under 35 U.S.C. 154(b) by 1174 days.

(21) Appl. No.: 14/139,681

(22) Filed: Dec. 23, 2013

(65) Prior Publication Data

US 2015/0174481 A1 Jun. 25, 2015

(51) Int. Cl.
A63F 13/216 (2014.01)
A63F 13/65 (2014.01)
A63F 13/655 (2014.01)
A63F 13/332 (2014.01)

(52) U.S. Cl.
CPC ............ *A63F 13/216* (2014.09); *A63F 13/65* (2014.09); *A63F 13/332* (2014.09); *A63F 13/655* (2014.09)

(58) Field of Classification Search
CPC .............. A63F 13/216; A63F 2300/205; A63F 2300/5573; A63F 13/332; A63F 13/65; A63F 13/655
See application file for complete search history.

(56) References Cited

U.S. PATENT DOCUMENTS

| 6,401,033 B1* | 6/2002 | Paulauskas | A63F 13/10 340/990 |
| 8,753,200 B1* | 6/2014 | Supanc | G07F 17/3237 463/2 |
| 9,526,984 B2* | 12/2016 | Thomas | A63F 13/85 |
| 10,134,061 B2* | 11/2018 | Serino | G09F 9/30 |
| 2002/0142759 A1* | 10/2002 | Newell | A63F 13/12 455/414.1 |
| 2003/0144047 A1* | 7/2003 | Sprogis | A63F 13/12 463/9 |
| 2004/0185881 A1* | 9/2004 | Lee | A63F 13/12 455/466 |
| 2008/0009349 A1* | 1/2008 | Wolfe | H04W 4/02 463/42 |
| 2008/0014964 A1* | 1/2008 | Sudit | H04L 43/06 455/456.1 |
| 2008/0039203 A1* | 2/2008 | Ackley | A63F 13/79 463/40 |

(Continued)

OTHER PUBLICATIONS

"Coolest Free Scavenger Hunt Ideas for Adults and Teens", retrieved from <<URL:http://www.coolest-parties.com/free-scavenger-hunt-ideas.html>>.*

*Primary Examiner* — Malina D. Blaise
(74) *Attorney, Agent, or Firm* — FIG. 1 Patents

(57) ABSTRACT

A method and a system of a geo-location quest game. For example, registering game participants to play a geo-location quest game within a game environment having a plurality of beacon devices which are capable of providing location information for registered game participants within the game environment. In further examples, presenting, on the beacon enabled user device, to the registered game participants, a description of a first task in the geo-location quest game and a request for first task completion information, the first task having a start and end location within the game environment. In another example, receiving the requested first task completion information from the registered game participants.

33 Claims, 20 Drawing Sheets

(56) References Cited

U.S. PATENT DOCUMENTS

| | | | |
|---|---|---|---|
| 2008/0039204 A1* | 2/2008 | Ackley | A63F 13/332 463/40 |
| 2008/0097839 A1* | 4/2008 | Koren | G06Q 30/02 705/14.1 |
| 2008/0146338 A1* | 6/2008 | Bernard | A63F 13/00 463/42 |
| 2008/0280624 A1* | 11/2008 | Wrappe | G01S 1/68 455/456.1 |
| 2009/0036186 A1* | 2/2009 | Benco | G07F 17/32 463/9 |
| 2009/0170580 A1* | 7/2009 | Emalfarb | A63F 13/12 463/9 |
| 2011/0093349 A1* | 4/2011 | Drescher | G06Q 30/00 705/14.73 |
| 2011/0101610 A1* | 5/2011 | Mayalidag | A63F 3/00088 273/254 |
| 2011/0244964 A1* | 10/2011 | Glynne-Jones | A63F 13/12 463/40 |
| 2012/0052954 A1* | 3/2012 | Zhu | A63F 13/10 463/42 |
| 2012/0190455 A1* | 7/2012 | Briggs | H04L 67/38 463/42 |
| 2012/0327265 A1* | 12/2012 | Arujunan | H04N 1/00137 348/231.3 |
| 2013/0113655 A1* | 5/2013 | Shen | H04W 4/029 342/357.31 |
| 2013/0252686 A1* | 9/2013 | ONeill | G07F 17/3237 463/16 |
| 2013/0262203 A1* | 10/2013 | Frederick | G06Q 30/0209 705/14.12 |
| 2013/0267297 A1* | 10/2013 | Aligizakis | G07F 17/3218 463/17 |
| 2013/0288757 A1* | 10/2013 | Guthridge | A63F 13/12 463/2 |
| 2014/0122204 A1* | 5/2014 | Hills | G06Q 30/0222 705/14.23 |
| 2014/0122217 A1* | 5/2014 | Hills | G06Q 30/0239 705/14.39 |
| 2014/0155156 A1* | 6/2014 | Peck | A63F 13/12 463/31 |
| 2014/0173617 A1* | 6/2014 | Cudak | G06F 1/3206 718/104 |
| 2014/0235326 A1* | 8/2014 | Paracha | G06Q 10/101 463/25 |
| 2014/0274404 A1* | 9/2014 | Hoskins | A63F 13/795 463/42 |
| 2015/0088624 A1* | 3/2015 | Frederick | G06Q 30/0209 705/14.12 |
| 2015/0089158 A1* | 3/2015 | Aist | G06Q 30/0267 711/144 |
| 2015/0094080 A1* | 4/2015 | Bleecher Snyder | H04W 4/02 455/456.1 |
| 2015/0099585 A1* | 4/2015 | Barney | A63F 13/428 463/39 |
| 2015/0120462 A1* | 4/2015 | Zhang | G06Q 30/0267 705/14.64 |
| 2015/0127628 A1* | 5/2015 | Rathod | H04W 4/21 707/710 |
| 2015/0141149 A1* | 5/2015 | Thomas | A63F 13/85 463/42 |
| 2015/0141150 A1* | 5/2015 | Zha | H04L 67/2809 463/42 |
| 2016/0066004 A1* | 3/2016 | Lieu | H04N 21/2541 725/29 |
| 2016/0078333 A1* | 3/2016 | Simske | G06K 1/123 235/462.04 |
| 2016/0314705 A1* | 10/2016 | Segal | G06Q 10/06393 |
| 2016/0358203 A1* | 12/2016 | Rulli | G06Q 30/0239 |

\* cited by examiner

GAME SCOREBOARD 380

| Registered Participants | Quest Task 1 | Quest Task 2 | Quest Task 3 | Quest Task 4 | Time Elapsed |
|---|---|---|---|---|---|
| Susan | completed | completed | completed | | 50 min |
| Luke | completed | completed | | | 30 min |
| Garrett | completed | completed | | | 42 min |
| Sylvia | completed | | | | 25 min |

GEO LOCATION QUESTING

TECHNICAL FIELD

The present application relates generally to the technical field of merchandizing and, in one specific example, promoting the sale of products and services in physical stores.

BACKGROUND

The concept "Store of the Future" involves multiple shopping channels seamlessly integrating online and offline sales channels that create personal, relevant experiences for customers. Retailers are now focused on the total customer experience across all selling environments. The various shopping channels available today include physical stores, websites, online catalogues, social media, mobile apps, POS & payment systems, digital screens, touch screens and tablets.

Some stores which have been traditionally known as brick-and-mortar businesses (with physical presence) also have online shopping sites today. Other businesses have only an internet-only presence, such as online stores, which have no physical presence for shoppers to visit and buy from directly. In today's marketplace, physical stores often compete with online stores. Online stores often offer competitively priced products and allow consumers to compare pricing and availability from merchants located anywhere. Furthermore, online shopping may be conducted from almost anywhere, for example, from a consumer's home or even from within an aisle of a store in which a consumer is viewing a product. Although local merchants having physical stores offer many advantages to consumers (such as first hand inspection of a look and feel of a product, immediate availability of a purchased product and no shipping costs, and face-to-face customer service), local merchants must continually work on enhancing the in-store shopping experience to draw consumers into physical stores. In store events and activities often appeal to consumers and encourages them to visit physical stores.

BRIEF DESCRIPTION OF THE DRAWINGS

Some embodiments are illustrated by way of example and not limitation in the figures of the accompanying drawings in which:

FIG. 2D illustrates an example embodiment of a game scoreboard.

DETAILED DESCRIPTION

Example methods and systems of a geo-location quest game are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, geo-location quest games played within a game environment, such as a shopping mall or other locations having local merchants, may create an in-store shopping experience that encourages consumers to shop in physical stores. A geo-location quest game may use geo-location tracking devices to track registered game participants throughout their quest as they complete one or more quest tasks within an environment and compete against other registered game participants. The registered game participants may complete concurrently or sequentially. For some embodiments, beacon devices, which use Bluetooth™ low energy (BLE) communications protocols, are placed throughout the game environment and can communicate with user devices, such as smart phones, to provide geo-location information for registered game participants, who has user devices checked into game-point locations, within the game environment. The geo-location quest games require the registered game participants to complete a number of quest tasks. Each quest task, may include a starting point and an end point, and require the registered game participants to complete a task, such as send a picture of yourself next to a red Tesla located at the Tesla store. The quest task may then be verified. A scoreboard, which displays real-time updates on the competition and how each registered game participant is performing in the competition, may be displayed. The quest tasks may be personalized for users based on a variety of factors, for example gender, age, education, account information, etc.

Example Environment

Figure 1:
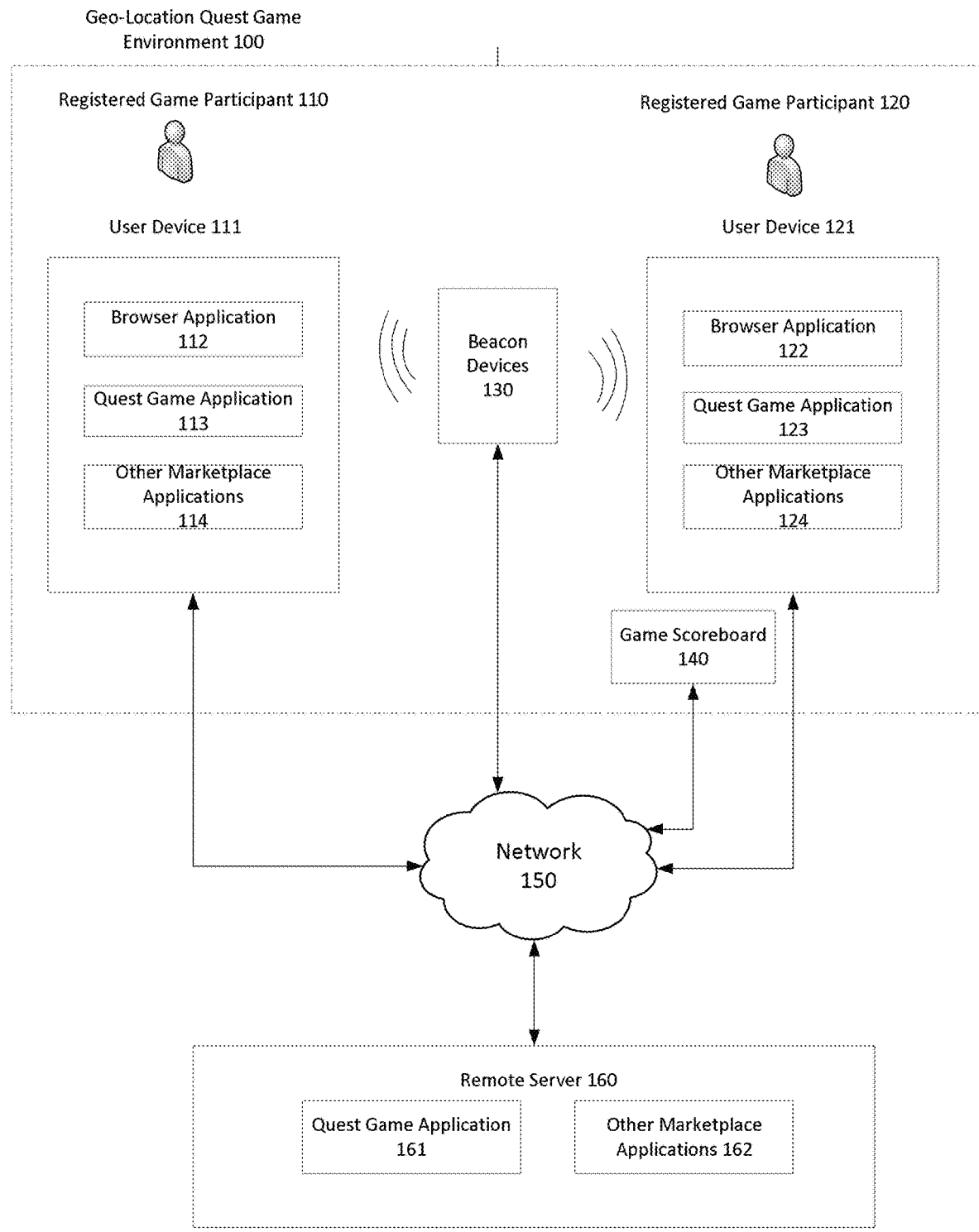
FIG. 1 is a diagram illustrating an example environment of a system for playing a geo-location quest game, according to various embodiments.

FIG. 1 is a diagram illustrating an example environment of a system for playing a geo-location quest game, according to various embodiments. The geo-location quest environment 100 includes user devices 111 and 121, beacon devices 130, game scoreboard 140, and a remote server 160 in communication over a network 150. Registered game participants 110 and 120 may be communicating with a remote server 160 over network 150 using user devices 111 and 121. In some embodiments, the number of registered game participants may vary and the number of beacon devices 130 may vary. In further embodiments, beacon devices 130 may refer to any type of wireless geo-location tracking devices, using Bluetooth™ LE or other communications protocols, that can be used for geo-location tracking within a geo-location quest game environment.

Network 150, in one embodiment, may be implemented as a single network or a combination of multiple networks. For example, in various embodiments, network 150 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

For example embodiments, user devices 111 and 121 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. User devices 111 and 121, in various embodiments, may be implemented using any appropriate combination of hardware and/or software configured for wired and/or wireless communication over network 150. For example, user devices 111 and 121 may be implemented as a wireless telephone (e.g., smart phone), tablet, personal digital assistant (PDA), notebook computer, and/or various other generally known types of wired and/or wireless mobile devices. In additional embodiments, user devices 111 and 121 may be Bluetooth™ low energy (BLE) communications protocol enabled devices or enabled for other wireless short range communications protocols.

For example embodiments, user devices 111 and 121 may be used to register shoppers to participate in a geo-location quest game, receiving information related to quest tasks (also referred to as "quest task information") via notifications, emails, text messages, etc., and providing and receiving location-based information within a game environment. Further, content may be displayed by particular applications or "apps" stored in a memory of user devices 111 and 121 and executed by one or more processors executing in user devices 111 and 121. One example of an application is a browser application 112 or 122 that displays content, such as a web page or a user interface using a browser that may be used to access quest game application (113, 123, 161) and other marketplace applications (114, 124, 162) having one or more components residing on user devices 111 and 121 and/or remote server 160. User devices 111 and 121 may include mobile apps downloaded and residing on user devices 111 and 121 to enable registered game participants 110 and 120 to access content through the downloaded mobile apps, such as quest game application 113 and 123 and other marketplace applications 114.

Figure 2A:
FIGS. 2A-2C illustrate a shopping environment for playing a geo-location quest game, according to an embodiment.
Figure 2B:

Exemplary embodiments of game scoreboard 140 include a display component for displaying to quest game audience (or viewers) and participants various quest game updates and results with respect to the quest game competition including various quest tasks. The display component may be a large TV display such as those available from various consumer electronic merchants. If a merchant, such as Best Buy, is sponsoring or offering the geo-location quest game as a marketing/sales promotion, the merchant may use the display component of game scoreboard 140 as an advertising tool to display new products available at the merchant's store. For example, the display component may be implemented using LCD, LED, plasma, DLP, and LPD technologies and may be incorporated into TVs, monitors, digital displays, signage displays, sports scoreboard displays etc. Similarly, user devices 111 and 121 may be provided by a merchant to advertise new smartphones to registered guest participants by allowing them to test and evaluate these devices and its features (such as cameras) while playing the geo-location quest game. Both geo-location quest game content and non-game content may be displayed by the display component of the game scoreboard 140. Examples of content to be presented by the display component of game dashboard 140 are shown in FIGS. 2A, 2B and 2D.

For example embodiments, game scoreboard 140 includes a combination of hardware and software capable of communication over network 150 for executing quest game application 161 and other marketplace applications 162 using a client device (not shown) and display component (not shown) in conjunction with user devices 111 and 121 and remote server 160. The game scoreboard 140 may include a display component and computing device, which may or may not be integrated with the display component, in example embodiments. For one embodiment, game scoreboard 140 is an ultra high definition HD 4K TV connected to a computing device running a special application that retrieves "scoring information" or a web page for accessing game account holder status. The special application may be a marketplace application (e.g., quest game application) and the "scoring information" may also be referred to as competitive updates in example embodiments.

For various embodiments, remote server 160, located within a cloud environment (not shown), may provide software as a service to game scoreboard 140 and/or user devices 111 and 121 where quest game application 160 and other marketplace applications 161 run on remote server 160. The game scoreboard 140 and/or user devices 111 and 121 may access the software-as-a-service through a client device (not shown), while cloud providers manage the infrastructure and platforms that run the software applications. Further, user devices 111 and 121 and the computing device within game scoreboard 140 may represent client devices that are capable of accessing software-as-a-service from a cloud environment.

For alternative embodiments, the computing device within game scoreboard 140 may include a local server (not shown), for executing quest game application 161 and other marketplace applications 162 locally rather than accessing the remote server 160 through network 150. For example embodiments, a local server may provide a back-up service to remote server 160 when the internet is down or other network related interruptions occur. For alternative embodiments, the applications are served to game scoreboard 140 and/or user devices 111 and 121 primarily by a local server and one or more servers and databases within a cloud environment are accessed to update content and perform commit transactions.

Figure 2C:
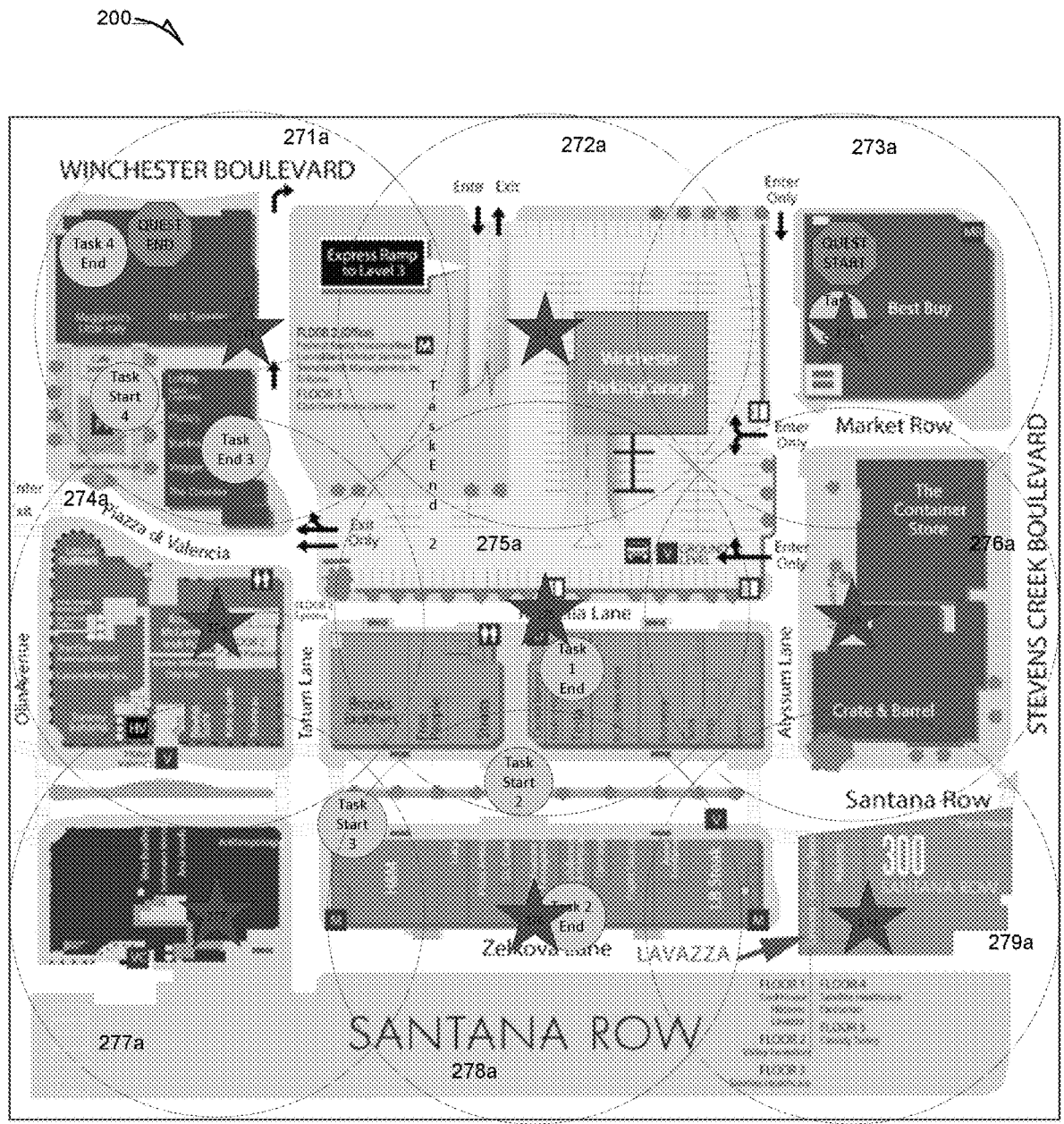
Figure 5:
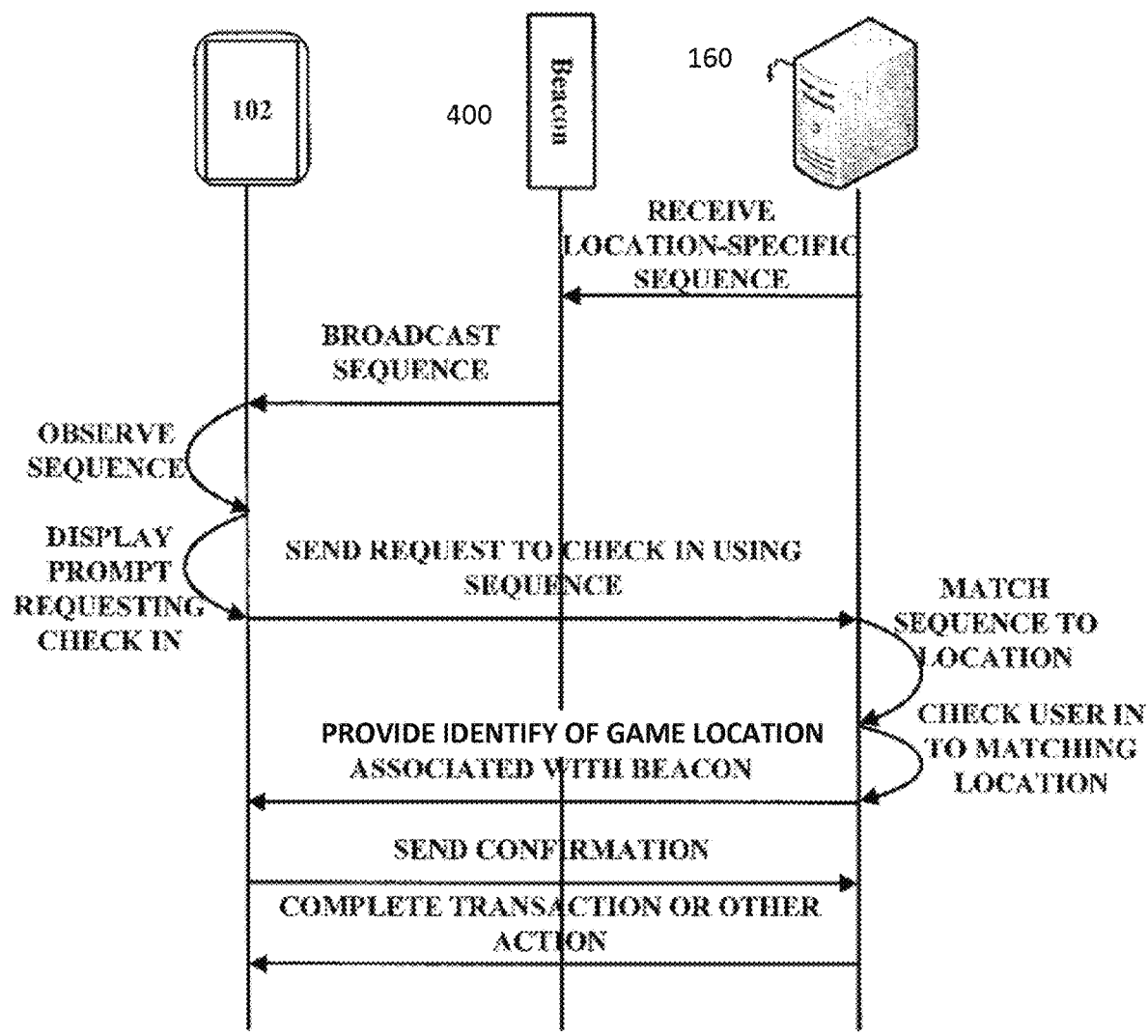
FIG. 5 is a diagram illustrating a flow of checking a user into a location using a specific sequence of packets, according to example embodiments.
Figure 6:
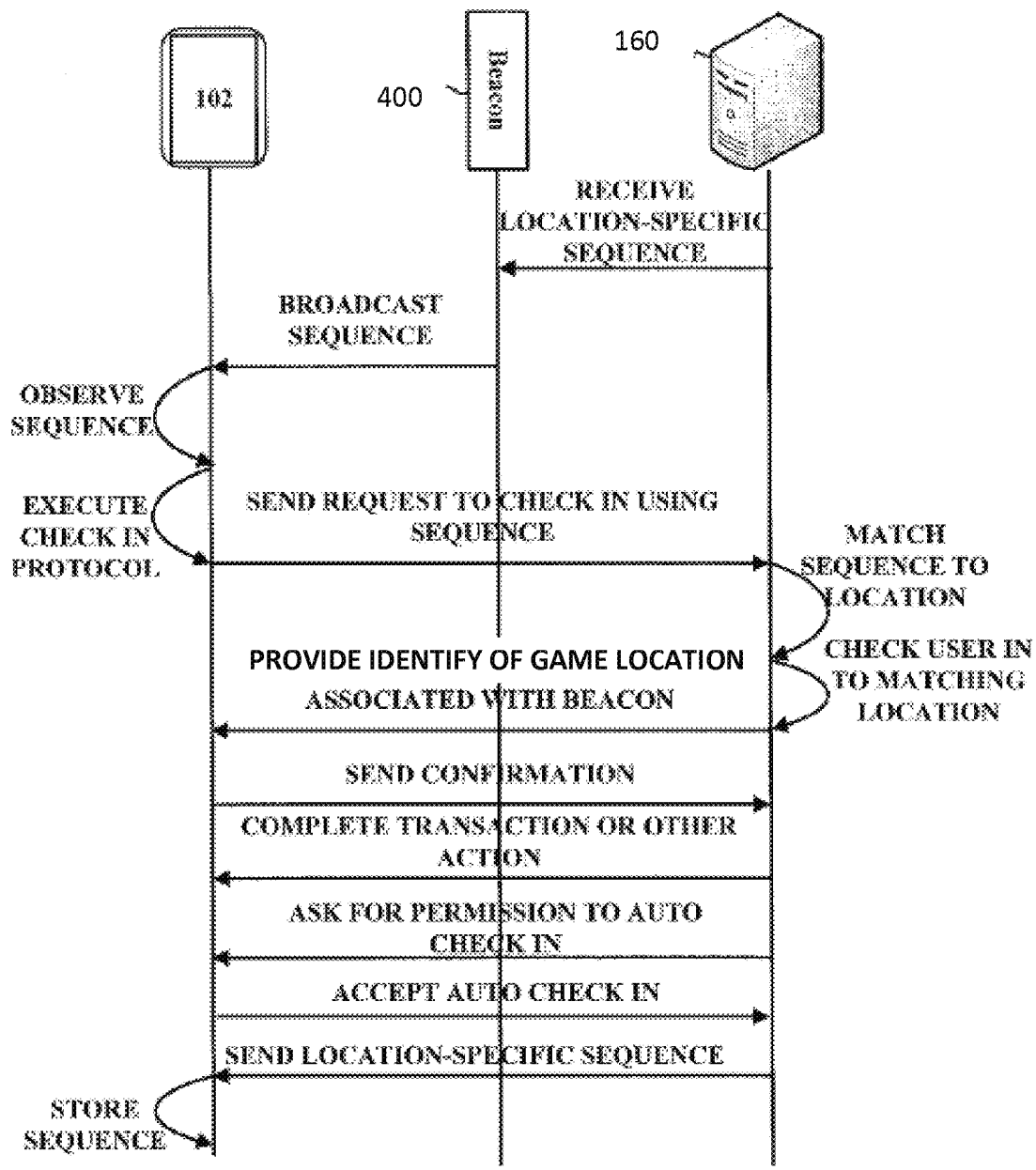
FIG. 6 is a diagram illustrating a flow of automatically checking a user into a location using a specific sequence of packets, according to example embodiments.

In various embodiments, the geo-location quest environment 100 includes beacon devices 130 or other wireless near range communication devices for enabling communications with user devices 111 and 121 to track geo-location information. The beacon devices 130 are installed at various game-point locations before the game starts, and typically occurs during the game planning process. In various embodiments, beacon devices 130 may be used alone or in conjunction with global positioning systems (GPS). Beacon devices 130 may provide more precise (or finer grain) geo-location tracking than GPS or may provide an alternative for GPS location tracking in areas lacking GPS. Furthermore, beacon devices 130 are useful in indoor areas or environments where GPS is not feasible. Once user devices 111 and 121 check-in to game-point locations associated with beacon devices 130, quest game application 161 and other marketplace applications 121 may track the location of registered game participants while playing the geo-location quest game throughout the game environment. Such location-based user tracking information may be displayed by user devices 111 and 121, and game scoreboard 140. FIGS. 5-6 illustrate examples of check-in processes for checking-in user devices 111 and 121 into game-point locations associated with beacon devices 130. FIG. 2C illustrates an example of game-point locations having beacon devices 130 within a geo-location quest game environment at a shopping mall.

Once registered game participants 110 and 120 have checked-in their user devices 111 and 121, respectively, registered game participants 110 and 120 may receive location-based notifications from quest game application 161, running remotely on remote server 160 or a local server (not shown) during the game. For example, quest game application 161 may provide game participants 110 and 120 with a map of the game environment to help them complete a quest task; hints to help registered game participants 110 and 120 on their quest to complete quest tasks or distractions to create obstacles to make the quest more challenging for registered game participants 110 and 120; receive rewards and/or notifications when tasks are complete and/or verified; and updates on the quest game competition including the performance of the registered game participants 110 and 120 which may be related to tasks completed, time elapsed, and place ranking of registered game participants 110 and 120.

The user devices 111 and 121 may be enabled to communicate with beacon devices 130 using BLE communications protocol when user devices 111 and 121 is within the communication zones of beacon devices 130 in example embodiments, and in alternative embodiments, other communication protocols may be used by beacons to track geo-location information. User devices 111 and 121, which are capable of communicating with beacon devices 130, may be referred to as beacon enabled user devices 111 and 121. FIG. 2C illustrates game-point locations where beacon devices 130 are located (shown by stars) and a corresponding communications zone (shown by circles around the stars) in an example game environment. For an example embodiment, beacon devices 130 using BLE communications protocols may have a communications range of about 50 meter or about 160 feet and may be able to discover (and subsequently check-in) user devices 111 and 121 with this range.

The beacon devices 130, may be small sensors placed inside a physical space (for example, quest start and end locations, task start and end location shown in FIG. 2A, stores, restaurants, parking garages or other locations within a game environment), that transmits and receives data to and from BLE enabled user devices 111 and 121. Beacon devices 130 may take on a variety of form factors. The discovery, handshaking and communications with beacon devices 130 may be handled by user devices 111 and 121 in example embodiments. This information provided by beacon devices 130 can be used to identify the location of user devices 111 and 121, and to connect user devices 111 and 121 to a service or to content provided by servers (or other computing devices), located locally or remotely in a cloud computing environment. The beacon devices 130 may transmit one or more sequences of information to user devices 111 and 121 to provide proximity information, as well as some content and instructions to user devices 111 and 121 to perform an action. In other words, a BLE enabled user devices 111 and 121 may receive personalized location-based notifications and actions while within the communications range of one or more beacon devices 130 within a game environment. By way of example, beacon devices 130 may be an iBeacon available from Apple Inc. of Cupertino, Calif. or a PayPal beacon available from eBay Inc. of San Jose, Calif.

Remote server 160, according to some embodiments, may be a server that hosts one or more marketplace applications (including quest game application 161) that may provide a number of marketplace functions and services to registered game participants 110 and 120 via user devices 111 and 121 and scoreboard 140.

In example embodiments, remote server 160 may be located in a cloud computing environment (not shown) that provides software and hardware resources via the Internet, and delivers applications, such as quest game application 161 and other marketplace applications 162, running on the cloud infrastructure, to user devices 111 and 121 over the Internet. The quest game application 161 and other marketplace applications 162 may be web-based and delivered on demand as a service (also referred to software-as-a-service (SaaS)) to user devices 111 and 121 over the Internet. Quest game application 161 and other marketplace applications 162 may be accessed by the registered game participants 110 and 120 through mobile apps (e.g., quest game applications 113 and 123 and other marketplace applications 114 and 124) or web browser applications 112 and 122 installed on user devices 111 and 121. The computing device within scoreboard 140 may represent client devices 710 and/or 712 and may communicate with remote server 160 (which may be represented by servers 114, 116, and/or 118) through a web client 706 and/or programmatic client 708, as described with reference to FIG. 7.

Remote server 160 may also include an account database (not shown) that includes account information for registered game participants 110 and 120 having an account on remote server 160. The account information may be used to personalize the geo-location quest game by assigning tasks to registered game participants based on their account information. For example, quest tasks may be personalized based gender, age, education level, financial information, interests, or other information available from the account information or derived from the account information.

In some embodiments, once a person becomes a registered game participant 110 or 120, and registers through his/her user device 111 or 121, the registered game participant's account information from an account database is accessible to quest game application 161 or other marketplace applications 162. Account information may include information about registered game participants 110 and 120 and may be sent to merchant(s) sponsoring the geo-location quest game when a registered game participant 110 or 120 is checked-in to game-point locations, based on preferences of registered game participants 110 and 120 or opting in or out of such features. For example, when registered game participants 110 and 120 checks-in to a game-point location, account information may be retrieved about registered game participants 110 and 120, such as an identity and profile (including age, gender, education level, etc.) of registered game participants 110 and 120 and a frequency or most recent check-in activity of registered game participants 110 and 120. The additional account information may include preferences, favorite items and past purchases of registered game participants 110 and 120 at various locations within a game environment. The additional information may include known measurements or sizes worn by registered game participants 110 and 120. In some embodiments, account information may also include some financial information related to registered game participants 110 and 120, such as how much registered game participants 110 and 120 has spent at similar locations, how much funds registered game participants 110 and 120 has in their account associated with remote server 160, and credit information of registered game participants 110 and 120 to determine creditworthiness of registered game participants 110 and 120.

Example Game Environment and User Interfaces

FIGS. 2A-2C illustrate an environment 200 within a shopping area or shopping mall, according to an example embodiment. The environment 200 illustrates a map of a shopping area, having retails stores/shops, restaurants, coffee shops, gyms, spas, car dealers and entities providing other services. Also shown in the environment 200 are various game-point locations, such as quest start 210 and quest end 211, showing the location of the start and end points of the geo-location quest game; and task 1 start 220 and task 1 end 221, task 2 start 230 and task 2 end 231, task 3 start 240 and task 3 end 240, and task 4 start 250 and task 4 end 250, showing the location of the start and end points of tasks 1-4 in an example embodiment.

In alternative embodiments, the number of game-point locations may vary, the number of quest tasks may vary, and different tasks may be assigned to different registered users based on the registered game participant's account information to personalize the quest game experience for different users. In further embodiments, the environment for playing the quest game may be any environment where beacon devices 130 may be positioned, or other geo-location tracking devices may be positioned, and where registered game participants 110 and 120 may complete a quest and associated quest tasks or where sufficient coverage by GPS is available or combination thereof.

The environment 200, as shown in FIG. 2C illustrates multiple game-point locations where beacon devices 130 may be positioned to provide geo-location information for registered game participants 110 and 120. The environment 200 includes nine game-point locations 271-279 (shown by stars) where beacon devices 130 are positioned within environment 200 to provide geo-location information for registered game participants 110 and 120. The circles 272a-279a around game-point locations 271-279 are intended to illustrate the communications range of each of the beacon devices 130 located at the game-point locations 271-279 (and are not drawn to scale with respect to environment 200). FIG. 2C illustrates that game-point location 271 has a communications range within circle 271a, and can communicate with user devices 111 and 121 located within circle 271a that are checked-in to a beacon device installed at game-point location 271. Similarly, circles 272a-279a illustrate the communications range of a corresponding one of beacon devices 130 installed at game-check point locations 272-279, respectively. During the check-in process of beacon devices 130, user devices 111 and 121 are associated with a game-point location where a beacon device is installed, and once user devices 111 and 121 are checked-in to that location, and the beacon device installed at that location can communicate with user devices 111 and 121 within its communications range (as illustrated by a circle).

FIG. 2C illustrates an embodiment where geo-location information may be provided for registered game participants 110 and 120 anywhere within game environment 200. At various locations where multiple circles overlap, geo-location information for registered game participants 110 and 120 may be associated with more than one beacon device.

In other embodiments, the number of game-point locations having beacon devices 137 (or other geo-location tracking devices) may vary. The game-point locations 271-279 may be located at one or more game-points within environment 200 where the quest start and end game-points are located, or where the quest task start and end game-points are located, in some embodiments. In further embodiments, game-point locations where beacon devices 130 are installed may not provide complete tracking of registered game participants 110 and 120 within environment 200. For example, beacon devices 130 may be positioned to track registered game participants at or near the quest start and end locations, and at or near quest task start and end points, but not at all other locations within environment 200.

The game scoreboard 140 includes a display component that may display geo-location game information or non-game information to viewers and registered game participants 110 and 120. The examples shown in FIGS. 2B and 2D are intended to be an illustration of an example of information that may be displayed on game scoreboard 140 and other content (including game and non-game information) and layouts may be used in other embodiments. FIG. 2B illustrates the location of registered game participants 110 and 120 with respect to various game-point locations, such as quest start and end locations and quest task start and end locations. The registered game participants shown in FIG. 2B include Susan 251, Luke 252, Garrett 253 and Sylvia 254. Real time geo-location information and competitive updates about registered game participants (such as Susan 251, Luke 252, Garrett 253 and Sylvia 254) may be generated and displayed on game scoreboard 140 as the geo-location quest game is in progress. According to FIG. 2B, Susan 251 is working on completing quest task 4, both Luke 252 and Garret 253 are working on completing quest task 3, and Sylvia is working on completing quest task 2.

FIG. 2D illustrates additional information that may be generated and displayed on game scoreboard 140, according to an example embodiment. Game scoreboard 380, displays information in a chart format, which includes a listing of registered participants (such as registered game participants 251-254) and the "complete" status of each of quest task in a particular geo-location quest game. The game scoreboard 380 may dynamically update as registered game participants 251-254 complete the various quest tasks and/or verified by a game sponsoring merchant or game administrator. The game scoreboard 380 also dynamically displays the time elapsed since the start of the geo-location quest game.

In various embodiments, one or more merchants may sponsor the game as an in-store sales/marketing promotion. These merchants may create and run the games, or alternatively, use an independent third party game creator and/or administrator. During the planning phase of the geo-location quest game, the merchant(s) and/or independent game creators and/or administrators design the quest tasks and arrange for the quest tasks to be done inside merchants' buildings or other locations within a game environment. Also, during the planning phase of the geo-location game, the game planners select the game-points for the quest game start and end locations, quest task start and end locations, and locations where beacon devices are installed.

FIGS. 12-16 illustrate a user device displaying quest game and quest task messages to registered game participants during a geo-location quest game, according to example embodiments. The user device 300 shown in FIG. 12 displays a message to request a user to register to play the geo-location quest game. The message states "Are you ready to start playing the geo-location quest game? Log in to play."

Figure 3:
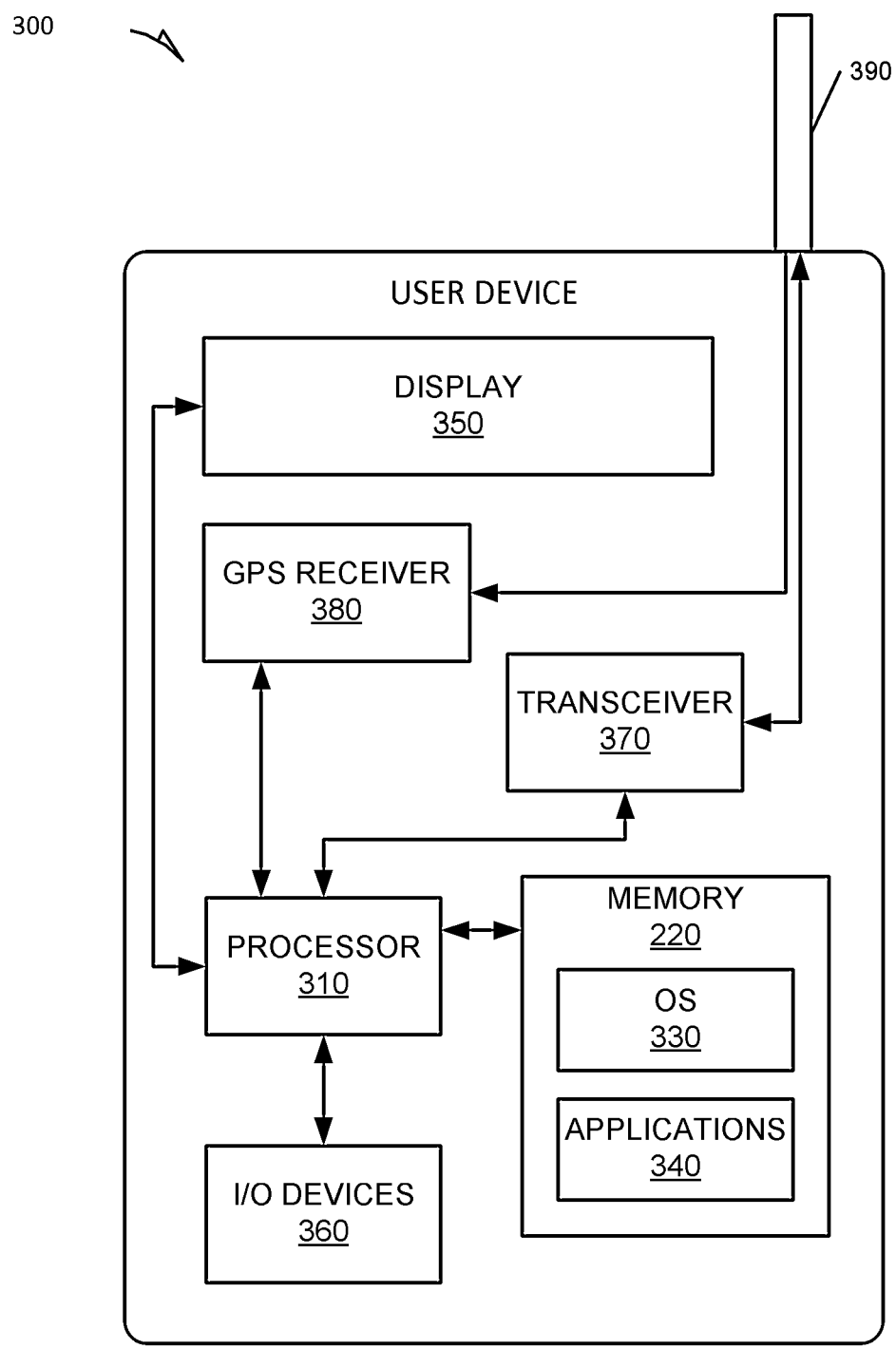
FIG. 3 is a block diagram illustrating a user device, according to an example embodiment.

The user device 300, shown in FIG. 3, may also display quest task messages and instructions (as shown in FIGS. 13-16) for a user to play the geo-location quest game. In the example described above with reference to FIGS. 2A-2D, four tasks are required to be completed in order for registered game participants can finish the entire quest. A winner may be selected based on various criteria such as number of quest tasks completed (and verified by either quest game application 161 or game adminstrators) in the shortest amount of time.

Figure 13:
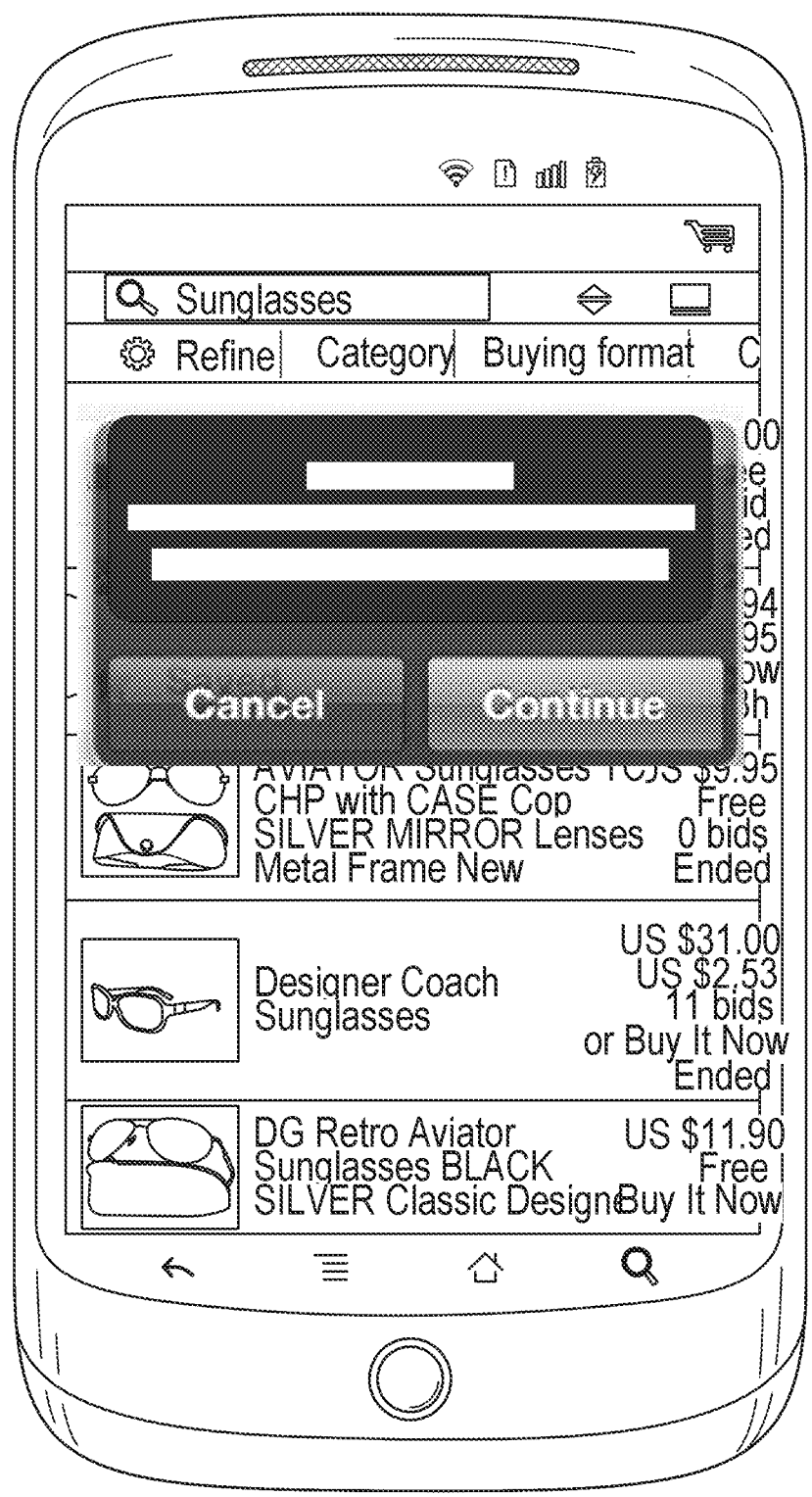

FIG. 13 displays a message describing quest task 1, in an example embodiment and states "Find a brand new red Tesla and send a picture of you next to the red Tesla." In this example, quest task 1 is completed after a registered game participant 251-254 sends the requested picture using a user device 300 as specified by the geo-location quest rules.

Figure 14:

FIG. 14 displays a message describing quest task 2, in an example embodiment and states "Try on your favorite lululemon yoga wear and take a 30 seconds video of you doing the tree pose." In this example, the quest task 2 is completed after a registered game participant 251-254 sends the requested video using a user device 300. In various embodiments, quest tasks may be initiated at the retailer's place of quest. For example, a registered game participant 251-254 may be instructed to find the Lululemon store in the game environment and once within the Lululemon store, quest tasks may be initiated by either by the retailer Lululemon or via a location-based notification.

Figure 15:
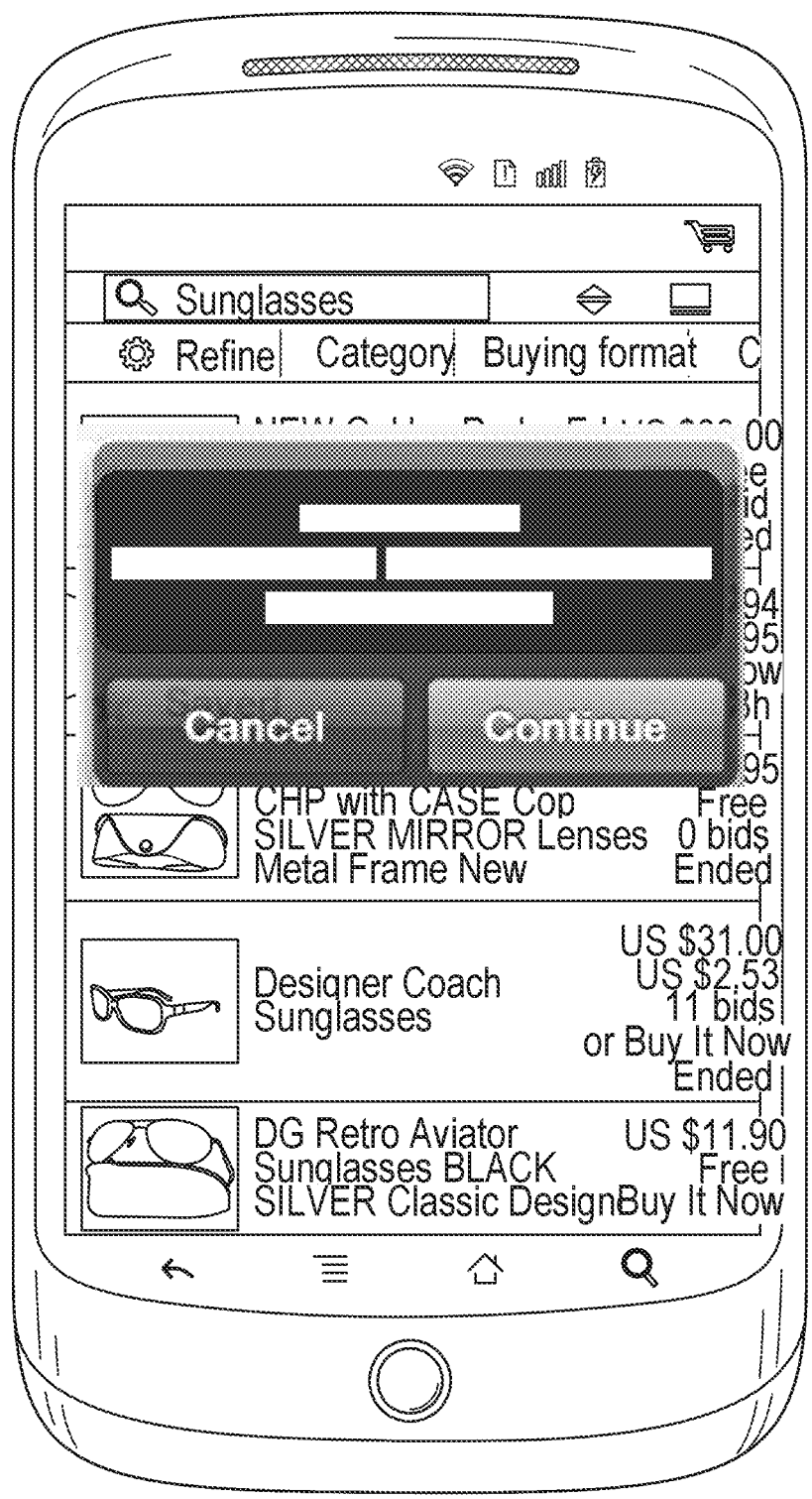

FIG. 15 displays a message describing quest task 3, in an example embodiment and states "Find your favorite cupcake at Kara's and send a picture of it." In this example, the quest task 3 is completed after a registered game participant 251-254 sends the requested picture using a user device 300. The registered game participants 251-254 may send pictures and videos using user device 300 to an email address, phone number, or other means provided to registered game participants 110 and 120 in the quest task instructions. For an example embodiment, quest game applications 113 and 123 (installed on user devices 111 and 121 and running while registered game participants 110 and 120 are playing the geo-location quest game) may handle the notifications, alerts, sending receiving instructions, photographs, videos, etc.

Figure 16:

FIG. 16 displays a message describing quest task 4, in an example embodiment and states "Find Luigi at Maggianos and follow his instructions." Once the registered game participant 251-254 find's Luigi at Maggianos, Luigi provides the registered game participant 251-254 with a special code to input into user device 300 to inform the quest game application 161 and geo-location quest game sponsors that the registered game participant 251-254 has finished his/or quest.

Example User Device

FIG. 3 is a block diagram illustrating a user device 300, according to an example embodiment. In some embodiments, user device 300 may be a mobile device such as a smartphone, and in alternative embodiments, user device 300 may be a tablet computer, a personal computer, laptop computer, netbook, or tablet computer, set-top box, video game console, head-mounted display (HMD) or other wearable computing device. In example embodiments, user device 300 may be a beacon enabled user device using BLE or other short-range wireless communications protocols. The user device 300 may include a processor 310, which may be any of a variety of different types of commercially available processors suitable for mobile devices (for example, an XScale architecture microprocessor, a Microprocessor without Interlocked Pipeline Stages (MIPS) architecture processor, or another type of processor). For example embodiments, processor 310 may be implemented with one or more central processing units (CPUs), micro-controllers, graphics processing units (GPUs) and/or digital signal processors (DSPs).

A memory 320, such as a Random Access Memory (RAM), a Flash memory, or other type of memory, is typically accessible to processor 310. The memory 320 may be adapted to store an operating system (OS) 330, as well as application programs 340, such as browser applications 112 and 122, quest game applications 113 and 123, and other marketplace applications 114 and 124 that provide additional features.

The processor 310 may be coupled, either directly or via appropriate intermediary hardware, to a display 350 and to one or more input/output (I/O) devices 360, such as a keypad, a touch panel sensor, a microphone and the like. User device 300 may also include I/O devices 360, allowing for registered game participants 110 and 120 of user device 300 to input information into and receive information from user device 300. Such information may include registering users to play the geo-location quest game (and thereby becoming a registered game participants 110 and 120); sending photos, videos or other information requested by various quest task while registered game participants 110 and 120 are playing a geo-location quest game; and receiving notification and other messages regarding the quest task and geo-location quest game.

Additionally, the user device 300 may include a camera module (not shown) for acquiring and processing images. For various embodiments, quest tasks require registered game participants 110 and 120 to take a picture or video with user device 300, to either complete a quest task or provide proof that a quest task has been completed.

Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the user device 300. In this manner, a connection between user device 300 with network 150 may be established. Further, in some configurations, a GPS receiver 380 may also make use of the antenna 390 to receive GPS signals. For a BLE enabled user device 300, transceiver 370 is configured to receive and send data packets from beacon devices 130 using BLE or other wireless short-range communications protocols.

Figure 4:
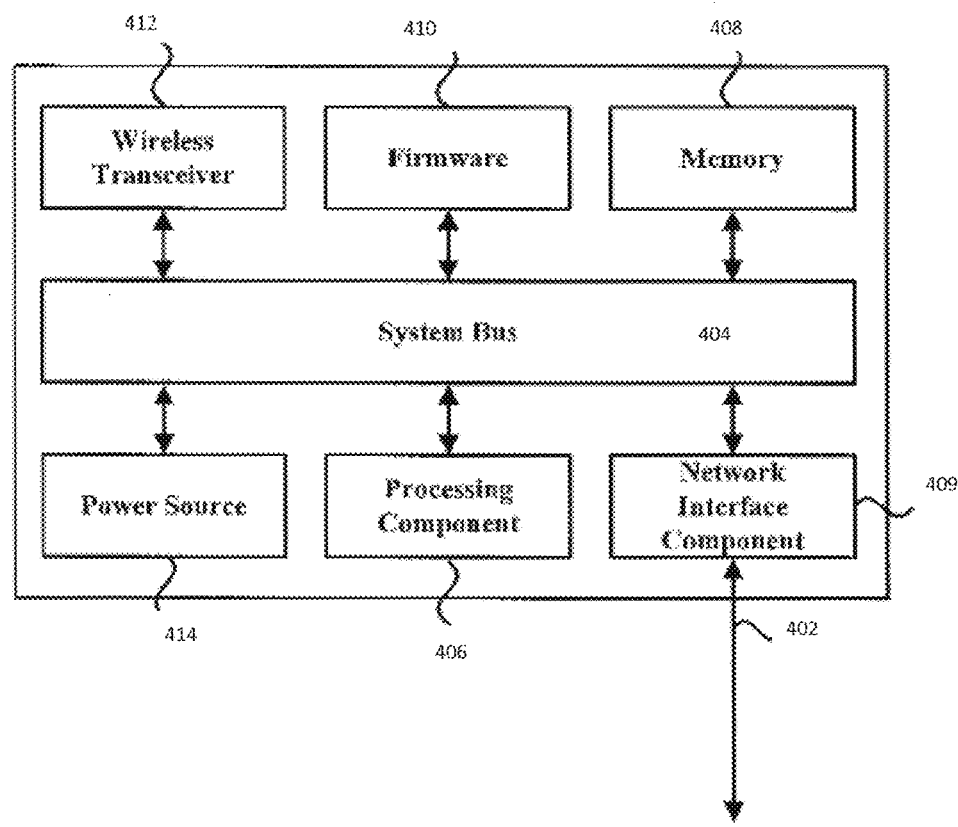
FIG. 4 is a diagram illustrating a beacon device, according to various embodiments.

FIG. 4 is a diagram illustrating a beacon device 400, according to various embodiments. The beacon devices 130, shown in FIG. 1, may include multiple beacon devices 400 in an example embodiment. As shown in FIG. 4, beacon device 400 includes a network interface component (NIC) 400 configured for communication with a network, such as network 150, shown in FIG. 1. For some embodiments, NIC 409 includes a wireless communication component, such as a wireless broadband component, a wireless satellite component, or various other types of wireless communication components including radio frequency (RF), microwave frequency (MWF), and/or infrared (IR) components configured for communication 402 with network 150. For other embodiments, NIC 409 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 150.

Beacon device 400 also includes a system bus 404 for interconnecting various components within beacon device 400 and communicating information between the various components. Such components include a processing component 406, which may be one or more processors, microcontrollers, graphics processing units (GPUs) or digital signal processors (DSPs), a memory component 408, firmware 410 and one or more wireless transceivers 412 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc. Beacon device 400 may also include a power source 414. Power source 314 may be any power source capable of providing sufficient current to power the components of beacon device 400. In some embodiments, power source 418 may be a battery, such as a watch battery or button cell.

In some embodiments, beacon device 400 may be configured to transmit information using wireless transceivers 412 based on instructions stored in memory 408 and/or firmware 410 executed by processing component 406. The instructions may be stored in memory 408 and/or firmware 410 by directly writing the instructions to memory 408 and/or firmware 410 over communication link 402 to beacon device hardware interface or by wirelessly receiving instructions by wireless transceivers 412. In some embodiments, beacon device 400 may be configured to transmit information to user devices 111 and 121 related to checking-in to a game-point location where beacon device 400 is located. In some embodiments, the transmitted information may include a packet sequence received from remote server 160 that identifies a particular merchant and/or merchant location. The packet sequence may include packets having a small size, such as 32 bits, that may include information that may be used to identify the location of a game-point within a game environment.

In some embodiments, beacon device 400 may also transmit instructions that when received by user devices 111 and 121 may cause marketplace applications to be executed by processing component 406 to cause user devices 111 and 121 to perform a check-in to a game-point location associated with a beacon 400. Further, beacon device 400 may transfer instructions that, when received by user devices 111 and 121 may allow registered game participants 110 and 120 to receive quest task and other geo-location game information.

In some embodiments, wireless transceiver 412 may correspond to a BLE transceiver configured to transmit and receive information according to the BLE communications protocol. In some embodiments, beacon device 400 may be a BLE beacon device or dongle such as described in U.S. patent application Ser. No. 13/938,860, filed on Jul. 10, 2013, the entire contents of which are hereby incorporated by reference in their entirety. Further, BLE beacon 135 may have a design such as shown in U.S. Design application No. 29/455,720, filed May 23, 2013, the entire contents of which are also incorporated herein by reference in their entirety. Additionally, beacon 135 may implement various check-in methods according to U.S. patent application Ser. No. 14/039,153, filed on Sep. 27, 2013, the entire contents of which are hereby incorporated by reference in their entirety.

FIG. 5 is a diagram illustrating a flow of checking a user into a location using a specific sequence of packets, according to example embodiments. As shown in FIG. 5, remote server 160 (or a local server) may send to beacon device 400 a specific sequence of packets that may be unique to a location where beacon device 400 is installed and may be used to identify the location. In some embodiments, the specific sequence of packets may have a small packet size, for example 32 bits, and the packets may include information to identify the location, such as game-point location. Beacon device 400 may store the sequence in memory and broadcast the sequence when active. When registered game participants 110 and 120 having user devices 111 and 121 are within a communications range of beacon device 400, user devices 111 and 121 may receive and observe the sequence broadcast by beacon device 400. Registered game participants 110 and 120 may then be prompted to check-in. When registered game participants 110 and 120 responds to the check-in prompt, user devices 111 and 121 may send a request to check-in to remote server 160 (or a local server) with the request including the received and observed packet sequence. Remote server 160 (or a local server) may then match the received sequence to a store sequence to determine the location and check-in registered game participants 110 and 120 into the matching location. In some embodiments, checking-in registered game participants 110 and 120 to a game-point location may allow registered game participants 110 and 120 to receive location-based notification and information, such as quest task description and instructions.

Once remote server 160 (or local server) has checked-in registered game participants 110 and 120 a game-point location, remote server 160 (or local server) may provide an identity of the game-point location associated with beacon device 400 for registered game participants 110 and 120 to review and to ensure that they are checking-in to the desired game-point location. Registered game participants 110 and 120 may then send a confirmation to remote server 160 (or local server). When remote server 160 (or local server) receives the confirmation, any actions associated with the check-in may be completed. In some embodiments, the flow shown in FIG. 5 may be repeated for each location having a beacon device 140 that transmit a specific and unique packet sequence such that user devices 111 and 121 may be prompted to check-in to a game-point location which is identified based on the received packet sequence.

FIG. 6 is a diagram illustrating a flow to automatically check-in a user into a game-point location using a specific sequence of packets, according to example embodiments. As shown in FIG. 6, remote server 160 (local server) may send to beacon device 400 a specific sequence of packets that may be unique to a location where beacon device 400 is installed and may be used to identify the game-point location. In some embodiments, the specific sequence of packets may have a small packet size, for example 32 bits, and the packets may include information to identify the game-point location. Beacon device 400 may store the sequence in memory and broadcast the sequence when active. When registered game participants 110 and 120 having user devices 111 and 121 arrives at a game-point location, user devices 111 and 121 may receive and observe the sequence broadcast by beacon device 400. Registered game participants 110 and 120 may use user devices 111 and 121 to execute a check-in protocol to check-in to the game-point location, and send a request to check-in to remote server 160 (local server) with the request including the received and observed packet sequence. Remote server 160 (local server) may then match the received sequence to a store sequence to determine the location and check-in registered game participants 110 and 120 into the matching location. Furthermore, checking-in to the location may also provide the game-point location with information about registered game participants 110 and 120, based on preferences of registered game participants 110 and 120, as well as account information.

Once remote server 160 (local server) has checked-in registered game participants 110 and 120 into the location, remote server 160 (local server) may provide an identity of the game-point location associated with beacon device 400 for registered game participants 110 and 120 to review to ensure that they are checking-in to the desired game-point location. Registered game participants 110 and 120 may then send a confirmation to remote server 160 (local server). When remote server 160 (local server) receives the confirmation, any actions associated with the check-in may be completed. Such actions may include receiving offers, specials, coupons, and the like for use at one or more merchants sponsoring the geo-location quest game. Remote server 160 (local server) may then send user devices 111 and 121 a message requesting permission for automatically checking-in registered game participants 110 and 120 whenever registered game participants 110 and 120 are at the game-point location (or within a communications range of beacon 400 installed at the game-point location). When registered game participants 110 and 120 accepts or enrolls in an automatic check-in, remote server 160 (local server) may send the specific sequence of packets that correspond to the game-point location to user devices 111 and 121. User devices 111 and 121 may then store the specific sequence of packets in any of memory. Consequently, the next time registered game participants 110 and 120 having user devices 111 and 121 arrives at or enters the same game-point location, when user devices 111 and 121 receives the specific sequence of packets sent by beacon device 400, processing component 206 of user devices 111 and 121 may match the received sequence to the specific sequence stored in any of memories and automatically execute a check-in protocol to send a check-in request to remote server 160 (local server) when the received sequence matches the stored sequence. In some embodiments, the flow shown in FIG. 6 may be repeated for each location having beacon devices 400 that transmit a specific and unique packet sequence such that any of memories of user devices 111 and 121 may store a specific and unique sequence for each game-point location enabling registered game participants 110 and 120 having user devices 111 and 121 to automatically check-in to each location based on the received packet sequence. In alternative embodiments, other processes to check-in a user device 300 may be implemented.

Example Platform Architecture

Figure 7:
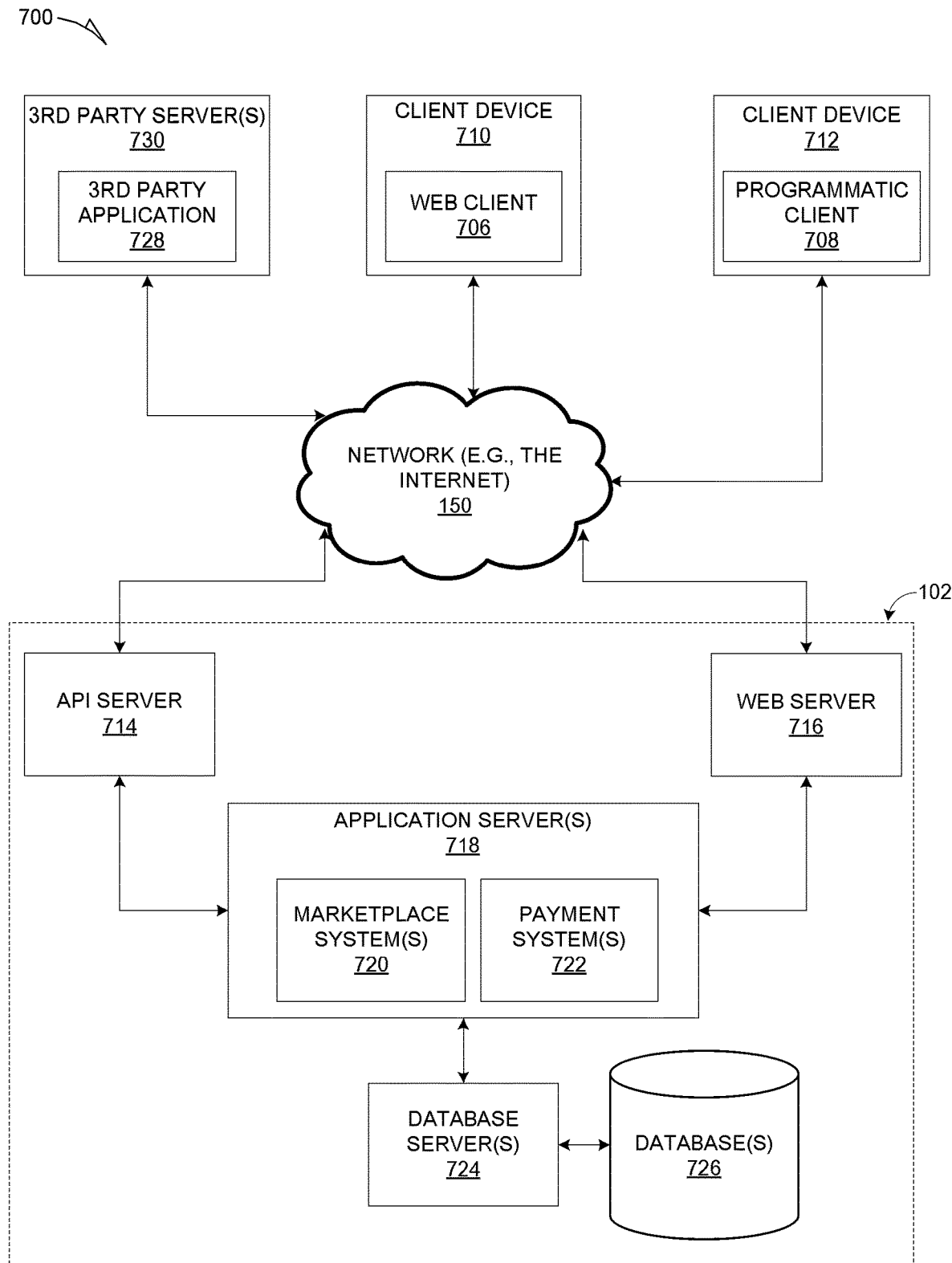
FIG. 7 is a network diagram depicting a client-server system, within which one example embodiment may be deployed.

FIG. 7 is a network diagram depicting a client-server system 700, within which one example embodiment may be deployed. A networked system 702, in the example form of a network-based marketplace or publication system, provides server-side functionality, via a network 150 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Wash. State), and a programmatic client 708 executing on respective client machines 710 and 712. User devices 111 and 121, shown in FIG. 1 and user device 300 represent client devices, such as client device 710 and client device 712.

An Application Program Interfaces (API) server 714 and a web server 716 are coupled to, and provide programmatic and web interfaces respectively to, one or more application servers 718. The application servers 718 host one or more marketplace applications 720 and payment applications 722. The application servers 718 are, in turn, shown to be coupled to one or more databases servers 724 that facilitate access to one or more databases 726. For example embodiments, application server(s) 718 may include remote server 160 in example embodiments.

The web server 716 provides a standardized way of integrating web-based applications using XML, SOAP, WDSL and UDDI open standards over an Internet protocol backbone. For the example embodiment shown in FIG. 1, the web server 716 may be used to retrieve various web-based server applications (for example, quest game application 161) or other web services functions for the networked system 202 according to an example embodiment.

The marketplace applications 720 (which may include quest game application 161 in some embodiments) may provide a number of marketplace functions and services to users that access the networked system 702. The payment applications 722 may likewise provide a number of payment services and functions to users. The payment applications 722 may allow users to accumulate value (e.g., in a commercial currency, such as the U.S. dollar, or a proprietary currency, such as "points") in accounts, and then later to redeem the accumulated value for items (e.g., goods or services) that are made available via the marketplace applications 720. While the marketplace and payment applications 720 and 722 are shown in FIG. 7 to both form part of the networked system 702, it will be appreciated that, in alternative embodiments, the payment applications 722 may form part of a payment service that is separate and distinct from the networked system 702.

The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 726 via the database servers 728.

Further, while the system 700 shown in FIG. 7 employs a client-server architecture, the present invention is of course not limited to such an architecture, and could equally well find application in a distributed, peer-to-peer, architecture system, or cloud computing environment, for example. The various marketplace and payment applications 720 and 722 could also be implemented as standalone software programs, which do not necessarily have networking capabilities.

The web client 706 accesses the various marketplace and payment applications 720 and 722 via the web interface supported by the web server 716. Similarly, the programmatic client 708 accesses the various services and functions provided by the marketplace and payment applications 720 and 722 via the programmatic interface provided by the API server 714. The programmatic client 708 may, for example, be a seller application (e.g., the TurboLister application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party website may, for example, provide one or more promotional, marketplace or payment functions that are supported by the relevant applications of the networked system 702.

Example Geo-Location Quest Game System

Figure 8:
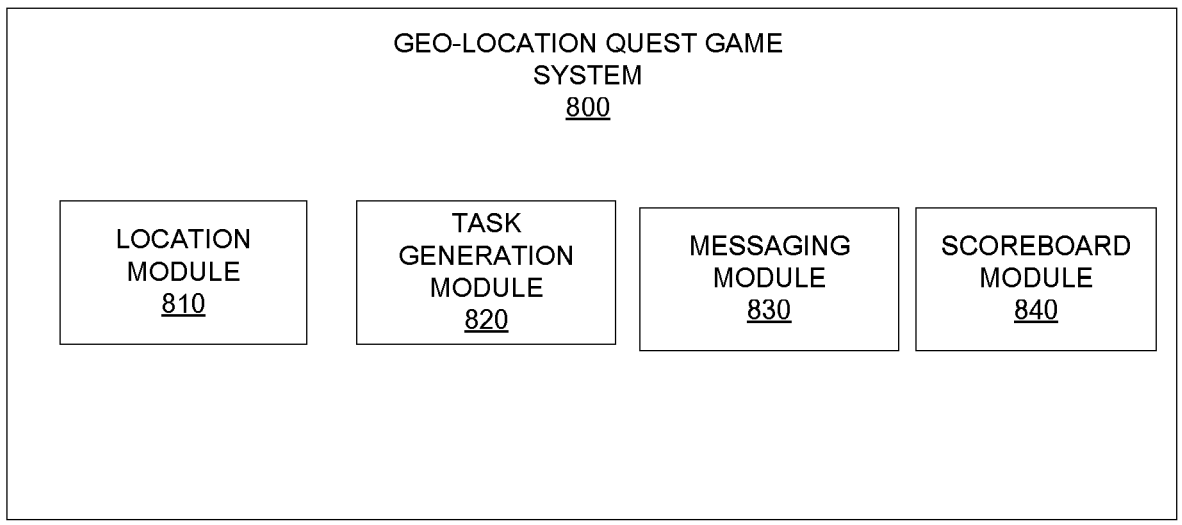
FIG. 8 illustrates a block diagram of a geo-location quest system, according various embodiments.

FIG. 8 illustrates a block diagram of a geo-location quest game system 800, according to various embodiments. The geo-location quest system 800 includes a location module 810, a task generation module 820, a messaging module 830 and a scoreboard module 840.

Location module 810 is used for tracking the geo-location of registered game participants 110 and 120 while playing the geo-location quest game within a game environment. For example embodiments, location within a game environment and proximity to a game-point location (where a beacon device 400 may be installed) may be tracked for registered game participants 110 and 120. For some embodiments, registered game participants may be tracked throughout the entire game environment or, in alternative embodiments, tracked only in specific areas within the game environment such as game-points associated with task start and end locations.

The geo-location of registered game participants 110 and 120 may be tracked once registered game participants check-in their user devices 111 and 121. FIGS. 5 and 6 describe check-in processes using beacon devices, such as 130 and 300, according to example embodiments. User devices 111 and 121 may be checked-in to a game-point location once it is within a communications zone or range of a beacon device 300 located at the game-point location. The geo-location information received, processed and stored by the location module may be used to track the registered game participants 110 and 120 during the geo-location quest game while completing the various quest tasks, and further displayed by the scoreboard module 840 on a display component to viewers and registered game participants 110 and 120, according to various embodiments. The location module 810 provides location-based notifications and messages to registered game participants 110 and 120 thru user devices 111 and 121, respectively. For example embodiments, the location-based notifications and messages include quest task information, such as those provided in FIGS. 12-16, or various rewards and coupons.

In further embodiments, geo-location quest game system 800 tracks and displays the various game-point locations. The game-point locations may include quest game start and end locations, quest task start and end locations, and locations where beacon devices 130 are installed and their corresponding communications zone to ensure the appropriate level of geo-location information for registered game participants 110 and 120 can be generated, tracked and presented during the geo-location quest game.

The task generation module 820 is responsible for generating quest tasks for the geo-location quest games, and providing the necessary information to registered game participants to start and end quest tasks to play the geo-location game. The quest tasks for the geo-location quest game may be created to enhance the in-store shopping experience for consumers at physical stores and shopping malls. The quest tasks created for the geo-location quest games may include any type of task that is appropriate for the registered game participants 110 and 120 to complete within a game environment where the geo-location of registered game participants 110 and 120 can be tracked. In an example game environment in a shopping mall, one or more merchants within the shopping mall may sponsor the geo-location quest game and may offer geo-location quest games on a regular basis or to run special events, in-store promotions or other sales/marketing related activities. Merchants having physical stores often compete with their own online store or online stores of other merchants. In store promotions that require customers to visit the shopping mall and provide fun filled activities for consumers, may encourage consumers to make purchases at physical stores, rather than online.

A quest task includes at least a start location and an end location, where a quest task is completed once registered game participants reaches the end location and completes a specified task, according to example embodiments. In further embodiments, quest tasks may be personalized for registered game participants 110 and 120 based on various factors and information such as gender, age, ethnicity, interests, account information, etc. For various embodiments the completion of a task is verified. Examples of quest tasks are shown in FIGS. 12-16. A winner of a geo-location quest game may be the person who completes all quest tasks in the shortest amount of time. The task information provided to registered game participants 110 and 120 via user devices 111 and 121 may be location-based notifications. For example, when registered game participants 110 and 120 at a game-point representing a task start or quest start, the registered game participants 110 and 120 receive task information, including a description of the quest task and a request for quest task completion information.

A message module 830 provides functionality to registered game users 110 and 120, and others who are interested in registering to play the geo-location quest game, to receive quest game and quest task information, description of quest tasks in the geo-location quest game and requests for quest task completion information, as well as quest game updates that may be displayed by scoreboard module 840. Messaging module 830 is responsible for the generation and delivery of messages to users of the networked system 702, such messages for example prompting a user to register to play the geo-location quest game, or prompt registered game participants 110 and 120 to check-in various game-points for geo-location tracking and to receive location-based notifications and messages.

Message module 830 may utilize anyone of a number of message delivery networks and platforms to deliver messages to registered game participants 110 and 120. For example, messaging applications 2324 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The scoreboard module includes a computing device (which may operate as a local server or client device) and a display component, communicatively coupled to the computing device via a wired or wireless network. The client device may be client device 710 or 712 shown in FIG. 7, for receiving services (SaaS) from a cloud computing environment for the geo-location quest game according to an example embodiment. In other embodiments, scoreboard module 840 may include a local server that provides backup services to remote server 160 to run the quest game application 161, or alternatively, operate as the primary server for running quest game application 161 locally. The display component of scoreboard module 840 generates and/or displays images providing competitive and performance updates of the registered game participants 110 and 120 during the geo-location quest game according to various embodiments. In various embodiments, the display component generates and displays content related to various product items for sale by retail stores or merchants, including item descriptions, pictures, videos, catalogues, product comparison information/tables, advertisements, coupons, promotions, offers, deals, menus, and so on. The display components may be a form of advertising the features of new TV and display products sold at consumer stores such as the latest TVs offered for sale at Best Buy. For one embodiment, game scoreboard 140 is an ultra high definition HD 4K TV connected to a computing device running a special application that retrieves "scoring information" or a web page for accessing game account holder status. For example embodiments, FIGS. 2B and 2D illustrate content that may be displayed by the display component in scoreboard module 840.

Figure 9:
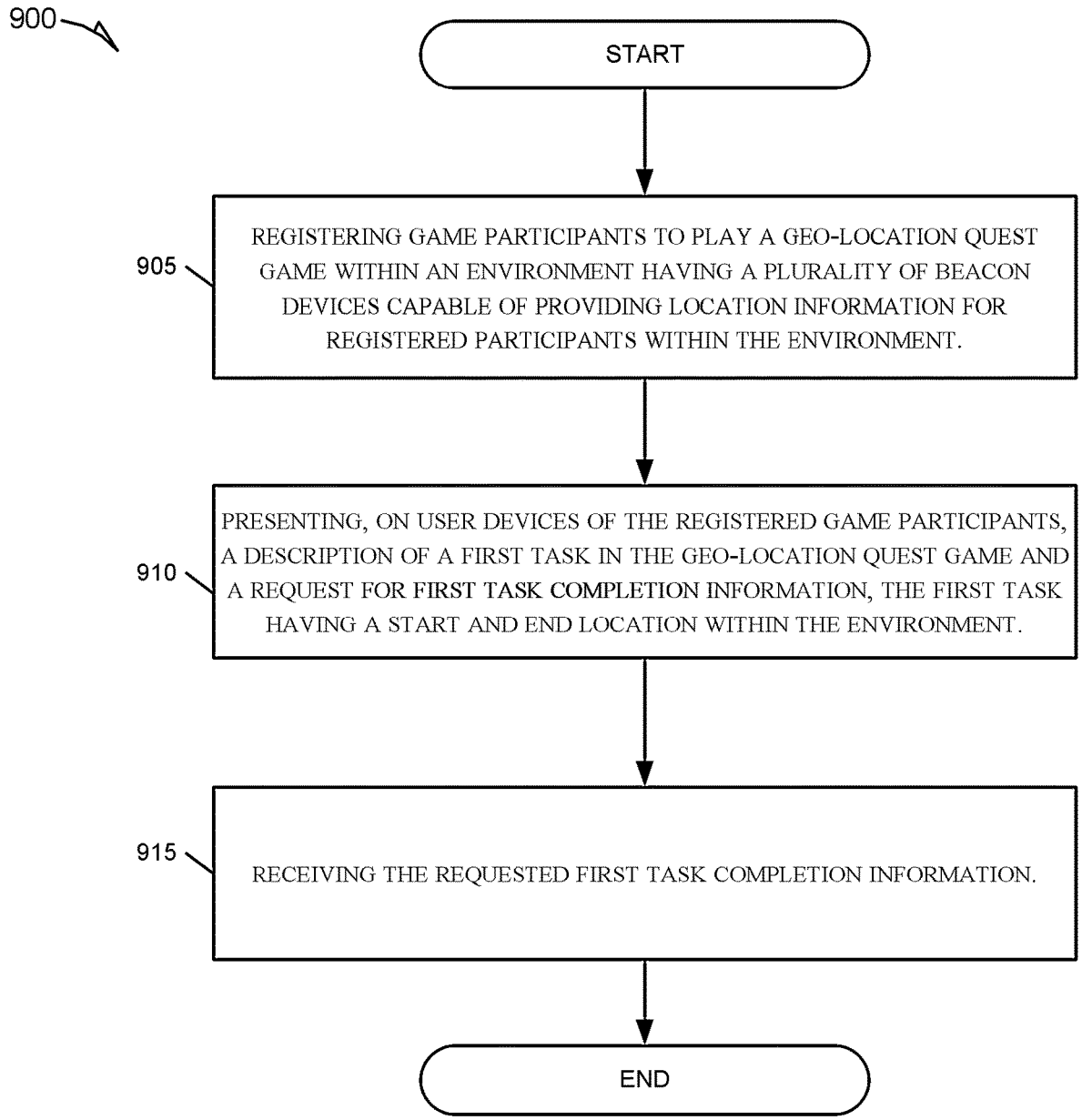
FIGS. 9-11 illustrate flow charts for playing a geo-location quest game, according to example embodiments.
Figure 10:
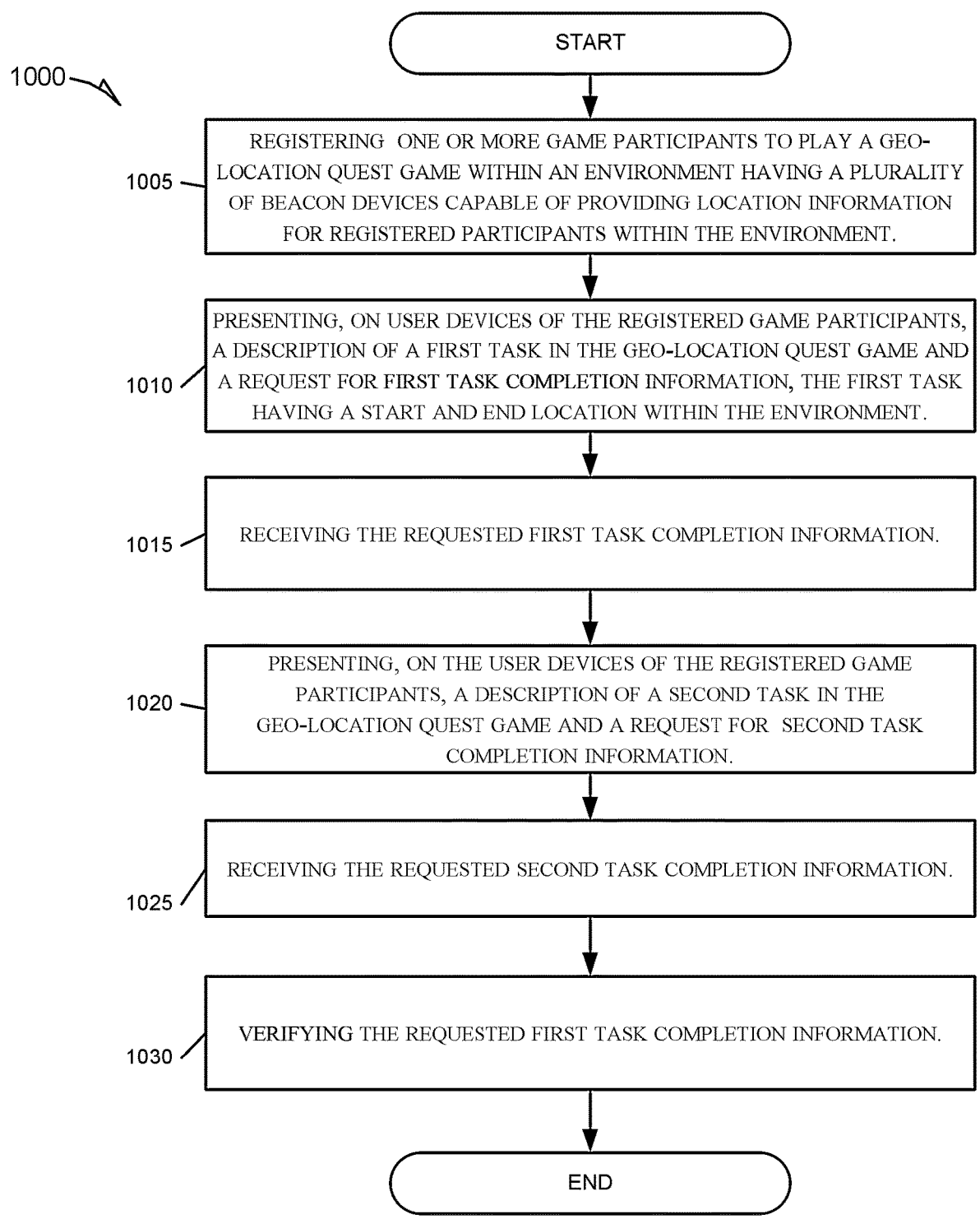
Figure 11:
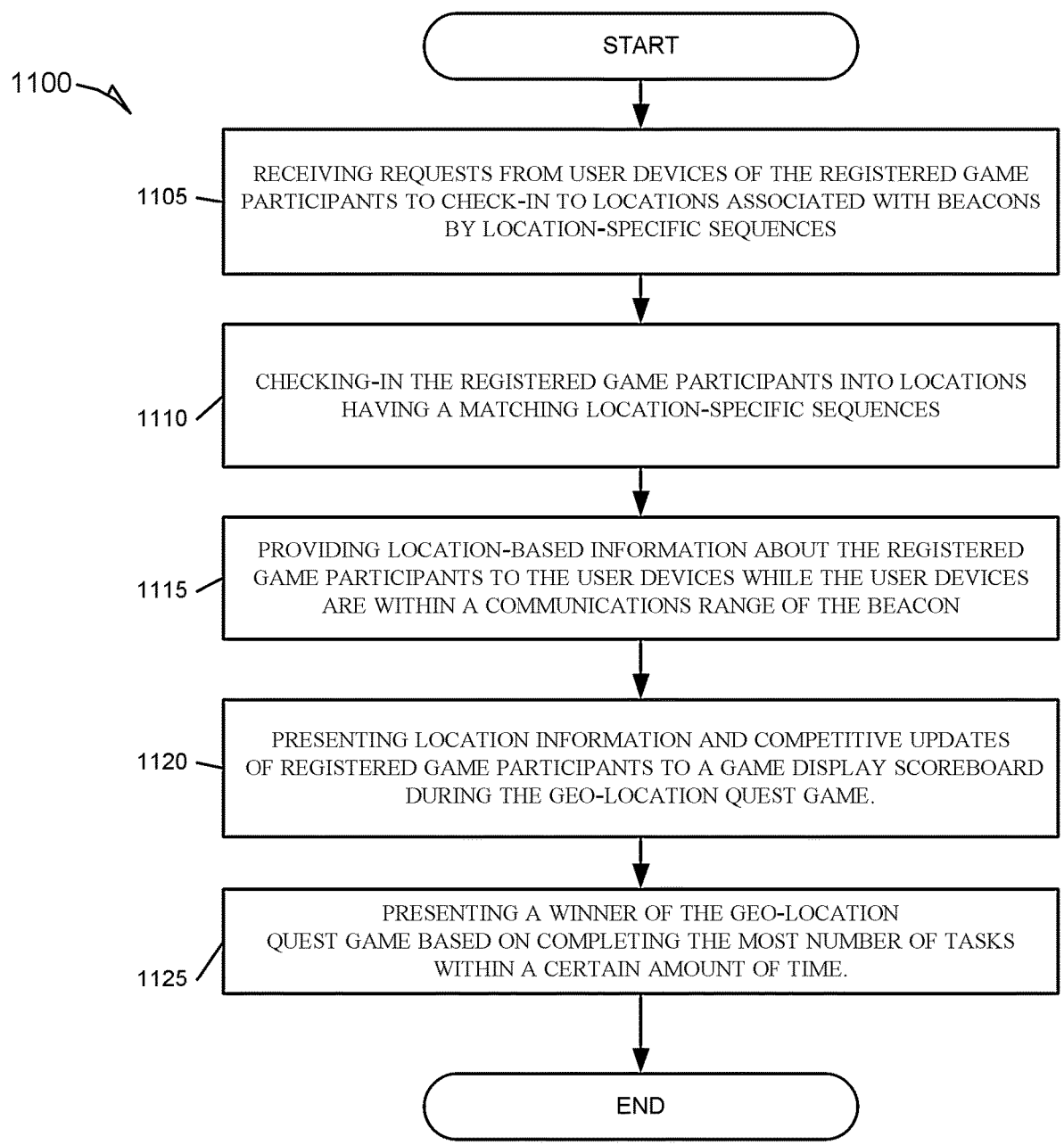
Figure 12:
FIGS. 12-16 illustrate a user device displaying messages to registered game participants during a geo-location quest game, according to example embodiments.

In various embodiments, a system may comprise a processor; a network interface; and a memory configured Example Flow Charts FIGS. 9-11 are processing flow charts illustrating example embodiments of methods for playing a geo-location quest game. In an example embodiment, the method 900 includes: at block 905, registering game participants to play a geo-location quest game within an environment having a plurality of beacon devices capable of providing location information for registered game participants within the environment; at block 910 presenting, on user devices of the registered game participants, a description of a first task in the geo-location quest game and a request for first task completion information, the first task having a start and end location within the environment; and at block 915 receiving the requested first task completion information. In further embodiments, registering the game participants to play the geo-location quest game within a shopping mall environment. In yet further embodiments, presenting on the user devices of the registered game participants, location-based notifications including the description of the first task and the request for the first task completion information.

In an example embodiment, the method 1000 includes: at block 1005, registering one or more game participants to play a geo-location quest game within an environment having a plurality of beacon devices capable of providing location information for registered game participants within the environment; at block 1010 presenting, on user devices of the registered game participants, a description of a first task in the geo-location quest game and a request for first task completion information, the first task having a start and end location within the environment; and at block 1015 receiving the requested first task completion information; at block 1020, presenting, on the user devices of the registered game participants, a description of a second task in the geo-location quest game and a request for second task completion information; at block 1025, receiving the requested second task completion information; and at block 1030, verifying the requested first task completion information for the registered game participants. In further embodiments, presenting the request for the first task completion information further comprises requesting each registered game participant to send a specified picture taken with the user device of the registered game participant at or near the end location of the first task.

In an example embodiment, the method 1100 includes: at block 1105, receiving requests from user devices of the registered game participants to check-in to locations associated with beacons by location-specific sequences; at block 1110, checking-in the registered game participants into locations having a matching location-specific sequences; at block 1115, providing location-based information about the registered game participants to the user devices while the user devices are within a communications range of the beacon; at block 1120, presenting location information and competitive updates of registered game participants to a game display scoreboard during the geo-location quest game; and at block 1125, presenting a winner of the geo-location quest game based on completing the most number of tasks within a certain amount of time. In further embodiments, sending location-based notifications to the user devices of the registered game participants to provide hints or distractions to the registered game participants during the geo-location quest game.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Example Machine Architecture and Machine-Readable Medium

Figure 17:
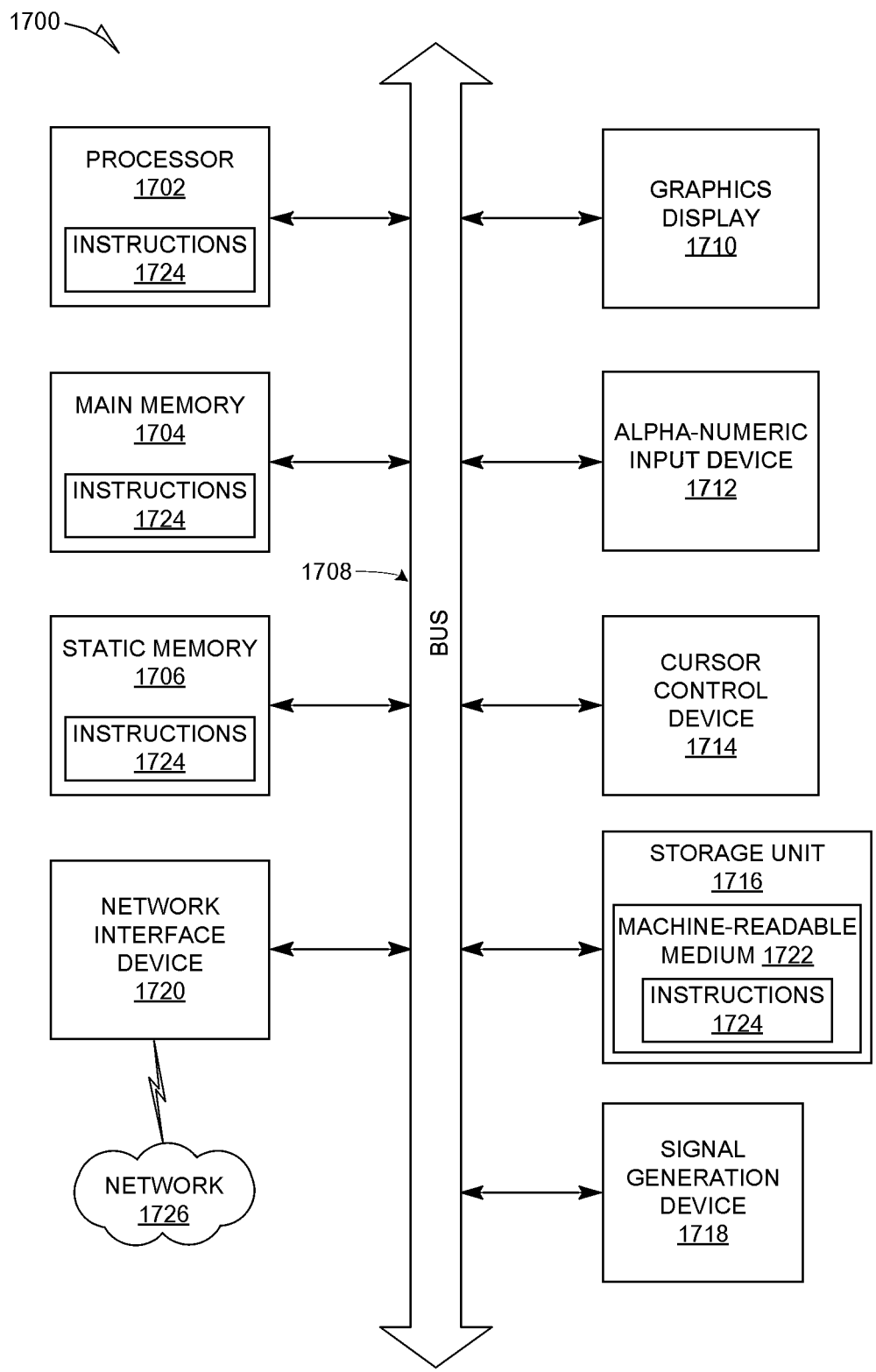
FIG. 17 shows a diagrammatic representation of machine in the example form of a computer system within which a set of instructions when executed may cause the machine to perform any one or more of the methodologies discussed herein.

FIG. 17 shows a diagrammatic representation of machine in the example form of a computer system 1700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, computing device or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720 by any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

For various embodiments a system comprises a processor 1702; a network interface device 1720; a memory including instructions 1724, when executed by the processor 1702, cause the system to: register game participants to play a geo-location quest game within an environment having a plurality of beacon devices capable of providing location information for registered game participants within the environment; present, on user devices of the registered game participants, a description of a first task in the geo-location quest game and a request for first task completion information, the first task having a start and end location within the environment; and receive the requested first task completion information.

In some embodiments, the system comprises a processor 1702; a network interface device 1720; a memory including instructions 1724, when executed by the processor 1702, cause the system to: register game participants to play a geo-location quest game within an environment having a plurality of beacon devices capable of providing location information for registered game participants within the environment; present, on user devices of the registered game participants, a description of a first task in the geo-location quest game and a request for first task completion information, the first task having a start and end location within the environment; receive the requested first task completion information; present, on the user devices of the registered game participants, a description of a second task in the geo-location quest game and a request for second task completion information; receive the requested second task completion information; and verify the requested first task completion information for the registered game participants.

In yet further embodiments, the system comprises a processor 1702; a network interface device 1720; a memory including instructions 1724, when executed by the processor 1702, cause the system to receive requests from user devices of the registered game participants to check-in to locations associated with beacons by location-specific sequences; check-in the registered game participants into locations having a matching location-specific sequences; and provide location-based information about the registered game participants to the user devices while the user devices are within a communications range of the beacon.

Additional embodiments include instructions 1724, when executed by the processor 1702, cause the system to present location information and competitive updates of registered game participants to a game display scoreboard during the geo-location quest game.

Additional embodiments include instructions 1724, when executed by the processor 1702, cause the system to request each registered game participant to send a specified picture taken with the user device of the registered game participant at or near the end location of the first task in the geo-location quest game.

Additional embodiments include instructions 1724, when executed by the processor 1702, cause the system to present a winner of the geo-location quest game based on completing the most number of tasks within a certain amount of time.

Additional embodiments include instructions 1724, when executed by the processor 1702, cause the system to register one or more game participants to play the geo-location quest game within a shopping mall environment.

Additional embodiments include instructions 1724, when executed by the processor 1702, cause the system to present a winner of the geo-location quest game based on completing the most number of tasks within a certain amount of time.

Additional embodiments include instructions 1724, when executed by the processor 1702, cause the system to present, on the user devices of the registered game participants, location-based notifications including the description of the first task and the request for first task completion information.

Thus, methods and systems for a geo-location quest game have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Note on the Abstract

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   registering game participants to play a geo-location quest game including one or more tasks within an environment having a plurality of beacon devices capable of providing location information for registered game participants within the environment;
   presenting, on user devices of the registered game participants, a prompt to check-in the registered game participants to a game-point location associated with at least one of the plurality of beacon devices to initiate a quest of the geo-location quest game;
   responsive to a response to the prompt to check-in the registered game participants to the game-point location, receiving, from the at least one beacon device, instructions that initiate the quest by allowing the user devices of the registered game participants to receive quest tasks;
   presenting, on the user devices of the registered game participants, a description of a first task of the quest;
   tracking progress of the registered game participants toward completing the first task of a plurality of different tasks of the quest using the user devices; and
   verifying completion of the first task of the quest by the registered game participants based, in part, on the tracking.

2. The method of claim 1, further comprising:
   presenting, on the user devices of the registered game participants, a description of a second task of the quest;
   tracking progress of the registered game participants toward completing the second task of the quest using the user devices; and
   verifying completion of the second task of the quest by the registered game participants based, in part, on tracking the progress toward completing the second task.

3. The method of claim 2, further comprising:
   verifying the completion of the first task for the registered game participants prior to presenting the description of the second task.

4. The method of claim 1, wherein the description of the first task instructs each registered game participant to send a specified picture taken with the user device of the registered game participant at or near an end-task location within the environment of the first task of the quest.

5. The method of claim 1, further comprising:
   receiving the response to the prompt from the user devices of the registered game participants to check-in;
   checking-in the registered game participants into locations having matching location specific sequences; and
   providing location-based information about the registered game participants to the user devices while the user devices are within a communications range of at least one beacon of the plurality of beacon devices.

6. The method of claim 5, further comprising:
causing presentation of location information of registered game participants to a game display scoreboard during the quest in real-time.

7. The method of claim 5, further comprising:
sending location-based notifications to the user devices of the registered game participants to provide hints or distractions to registered game participants during the quest.

8. The method of claim 1, further comprising:
presenting a winner of the quest based on completing the most number of tasks within a certain amount of time.

9. The method of claim 1, wherein at least one of the first task or a second task of the plurality of different tasks are personalized are different for different registered game participants.

10. The method of claim 1, wherein presenting the description of the first task of the quest further comprises presenting, on the user devices of the registered game participants, location-based notifications associated with the description of the first task.

11. The method of claim 1, further comprising:
personalizing the first task for different participants based on at least one of a group of factors including participant gender, participant age, participant education, and participant account information.

12. The method of claim 11, further comprising responsive to the response to the prompt to check-in the participant to the game-point location retrieving account information about the registered participant.

13. The method of claim 12, wherein the retrieved account information includes one or more of a prior spend of the registered participant at the game point location or a similar game point location, a check-in frequency, and a most recent check-in activity.

14. A system, comprising:
a processor;
a network interface device, coupled to the processor, to communicate with a network; and
a memory including instructions, when executed by the processor, cause the system to:
register game participants to play a geo-location quest game including one or more tasks within an environment having a plurality of beacon devices capable of providing location information for registered game participants within the environment;
present, on user devices of the registered game participants, a prompt to check-in the registered game participants to a game-point location associated with at least one of the plurality of beacon devices;
responsive to a response to the prompt to check in the registered game participants to the game-point location, receive, from the at least one beacon device, instructions that initiate the geo-location quest game by allowing the user devices of the registered game participants to receive quest tasks;
present, on the user devices of the registered game participants, a description of a first task in the geo-location quest game;
track progress of the registered game participants toward completing the first task of a plurality of different tasks of the geo-location quest game using the user devices; and
verify completion of the first task by the registered game participants based, in part, on the tracking.

15. The system of claim 14, wherein the instructions further cause the system to:
present, on the user devices of the registered game participants, a description of a second task in the geo-location quest game;
track progress of the registered game participants toward completing the second task of the geo-location quest game using the user devices; and
verify completion of the second task by the registered game participants based, in part, on tracking the progress toward completing the second task.

16. The system of claim 15, wherein the instructions further cause the system to:
verify the completion of the first task for the registered game participants prior to presentation of the description of the second task.

17. The system of claim 14, wherein the plurality of different tasks are required to be completed in an order such that the completion of the first task is required before completion of a second task.

18. The system of claim 14, wherein the instructions further cause the system to:
receive the response to the prompt from the user devices of the registered game participants to check-in;
check-in the registered game participants into locations having matching location-specific sequences; and
provide location-based information about the registered game participants to the user devices while the user devices are within a communications range of at least one beacon of the plurality of beacon devices.

19. The system of claim 18, wherein the instructions further cause the system to:
present location information and competitive updates of registered game participants to a game display scoreboard during the geo-location quest game in real-time.

20. The system of claim 18, wherein the instructions further cause the system to:
send location-based notifications to the user devices of the registered game participants to provide hints or distractions to registered game participants during the geo-location quest game.

21. The system of claim 14, wherein the instructions further cause the system to:
present a winner of the geo-location quest game based on completing the most number of tasks within a certain amount of time.

22. The system of claim 14, wherein the instructions further cause the system to register one or more game participants to play the geo-location quest game within a shopping mall environment.

23. The system of claim 14, wherein the instructions further cause the system to:
present, on the user devices of the registered game participants, location-based notifications associated with at least one of the description of the first task and the progress of the registered game participants toward completing the first task.

24. A non-transitory machine-readable storage medium including instructions that, when executed on a system, cause the system to:
register game participants to play a geo-location quest game including one or more tasks within an environment having a plurality of beacon devices capable of providing location information for registered game participants within the environment;
present, on user devices of the registered game participants, a prompt to check-in the registered game participants to a game-point location associated with at least one of the plurality of beacon devices;

responsive to a response to the prompt to check-in the registered game participants to the game-point location, receive, from the at least one beacon device, instructions that initiate the geo-location quest game by allowing the user devices of the registered game participants to receive quest tasks from the plurality of beacon devices;

present, on the user devices of the registered game participants, a description of a first task of a plurality of different tasks in the geo-location quest game;

track progress of the registered game participants toward completing the first each task of the plurality of different tasks of the geo-location quest game using the user devices; and verify completion of the first task by the registered game participants based, in part, on the tracking.

25. The machine-readable storage medium of claim 24, wherein the instructions further cause the system to:
present, on the user devices of the registered game participants, a description of a second task in the geo-location quest game;
track progress of the registered game participants toward completing the second task of the geo-location quest game using the user devices; and
verify completion of the second task by the registered game participants based, in part, on tracking the progress toward completing the second task.

26. The machine-readable storage medium of claim 24, wherein the description of the first task instructs the registered game participants to provide a different type of completion information than a description of a second task of the geo-location quest game.

27. The machine-readable storage medium of claim 24, wherein the description of the first task instructs each registered game participant to send a specified picture taken with the user device of the registered game participant at or near an end-task location within the environment of the first task in the geo-location quest game.

28. The machine-readable storage medium of claim 24, wherein the instructions further cause the system to:
receive the response to the prompt from the user devices of the registered game participants to check-in;
check-in the registered game participants into locations having matching location-specific sequences; and
provide location-based information about the registered game participants to the user devices while the user devices are within a communications range of at least one beacon of the plurality of beacon devices.

29. The machine-readable storage medium of claim 28, wherein the instructions further cause the system to:
present location information and competitive updates of registered game participants to a game display scoreboard during the geo-location quest game.

30. The machine-readable storage medium of claim 28, wherein the instructions further cause the system to:
send location-based notifications to the user devices of the registered game participants to provide hints or distractions to registered game participants during the geo-location quest game.

31. The machine-readable storage medium of claim 24, wherein the instructions further cause the system to:
present a winner of the geo-location quest game based on completing the most number of tasks within a certain amount of time.

32. The machine-readable storage medium of claim 24, wherein the instructions further cause the system to register one or more game participants to play the geo-location quest game within a shopping mall environment.

33. The machine-readable storage medium of claim 24, wherein the instructions further cause the system to:
present, on the user devices of the registered game participants, location-based notifications associated with at least one of the description of the first task and the progress of the registered game participants toward completing the first task.

* * * * *